(12) United States Patent
Saito et al.

(10) Patent No.: US 9,722,704 B2
(45) Date of Patent: Aug. 1, 2017

(54) OPTICAL TRANSMISSION APPARATUS AND METHOD FOR CONTROLLING OPTICAL POWER

(71) Applicant: FUJITSU LIMITED, Kawasaki-shi, Kanagawa (JP)

(72) Inventors: Taku Saito, Kawasaki (JP); Kosuke Komaki, Kawasaki (JP); Taketo Endo, Kawasaki (JP); Shuzo Matsushita, Kawasaki (JP); Hirofumi Araki, Kawasaki (JP); Hiroshi Nishida, Kawasaki (JP); Makoto Shimizu, Oyama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/012,000

(22) Filed: Feb. 1, 2016

(65) Prior Publication Data
US 2016/0248513 A1    Aug. 25, 2016

(30) Foreign Application Priority Data
Feb. 20, 2015    (JP) ................. 2015-031859

(51) Int. Cl.
  *H04B 10/40*    (2013.01)
  *H04B 10/079*    (2013.01)
  *H04B 10/67*    (2013.01)
  *H04J 14/02*    (2006.01)
(52) U.S. Cl.
  CPC ....... *H04B 10/40* (2013.01); *H04B 10/07955* (2013.01); *H04B 10/674* (2013.01); *H04J 14/021* (2013.01)

(58) Field of Classification Search
CPC .............. H04B 10/40; H04B 10/07955; H04B 10/674; H04J 14/021
USPC .......................................................... 398/38
See application file for complete search history.

(56) References Cited

U.S. PATENT DOCUMENTS

| | | | |
|---|---|---|---|
| 9,048,956 B2 * | 6/2015 | Suzuki | H04B 10/612 |
| 9,337,937 B2 * | 5/2016 | Duthel | H04B 10/07955 |
| 2011/0249969 A1 | 10/2011 | Ji et al. | |
| 2013/0236172 A1 | 9/2013 | Suzuki | |
| 2013/0322876 A1 * | 12/2013 | Gehrke | H04B 10/61 398/38 |
| 2013/0343751 A1 * | 12/2013 | Mamyshev | H04B 10/61 398/38 |

FOREIGN PATENT DOCUMENTS

| | | |
|---|---|---|
| JP | 2013-528982 | 7/2013 |
| JP | 2014-39156 | 2/2014 |
| WO | WO 2012/066859 A1 | 5/2012 |

* cited by examiner

*Primary Examiner* — Dalzid Singh
(74) *Attorney, Agent, or Firm* — Staas & Halsey LLP

(57) ABSTRACT

An optical transmission apparatus includes: an optical receiver configured to receive an optical signal; a variable optical attenuator configured to adjust a power of the optical signal to be input to the optical receiver according to a variable attenuation amount; and a controller configured to control the attenuation amount of the variable optical attenuator based on an electrical signal obtained by performing a coherent detection and a photoelectric conversion on the optical signal received by the optical receiver.

6 Claims, 17 Drawing Sheets

OPTICAL TRANSMISSION APPARATUS AND METHOD FOR CONTROLLING OPTICAL POWER

CROSS-REFERENCE TO RELATED APPLICATION

This application is based upon and claims the benefit of priority from the prior Japanese Patent Application No. 2015-031859, filed on Feb. 20, 2015, the entire contents of which are incorporated herein by reference.

FIELD

The embodiments discussed herein are related to an optical transmission apparatus and a method for controlling an optical power.

BACKGROUND

In an optical communication technology, in order for input optical power of an optical receiver to fall within an appropriate reception range, the input optical power may be controlled by a variable optical attenuator (VOA). For example, the input optical power is monitored by using a photodetector (or photodiode) (PD), and an attenuation amount of the VOA is controlled based on the monitoring result.

Related techniques are disclosed in, for example, Japanese National Publication of International Patent Application No. 2013-528982 and Japanese Laid-open Patent Publication No. 2014-039156.

SUMMARY

According to an aspect of the invention, an optical transmission apparatus includes: an optical receiver configured to receive an optical signal; a variable optical attenuator configured to adjust a power of the optical signal to be input to the optical receiver according to a variable attenuation amount; and a controller configured to control the attenuation amount of the variable optical attenuator based on an electrical signal obtained by performing a coherent detection and a photoelectric conversion on the optical signal received by the optical receiver.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
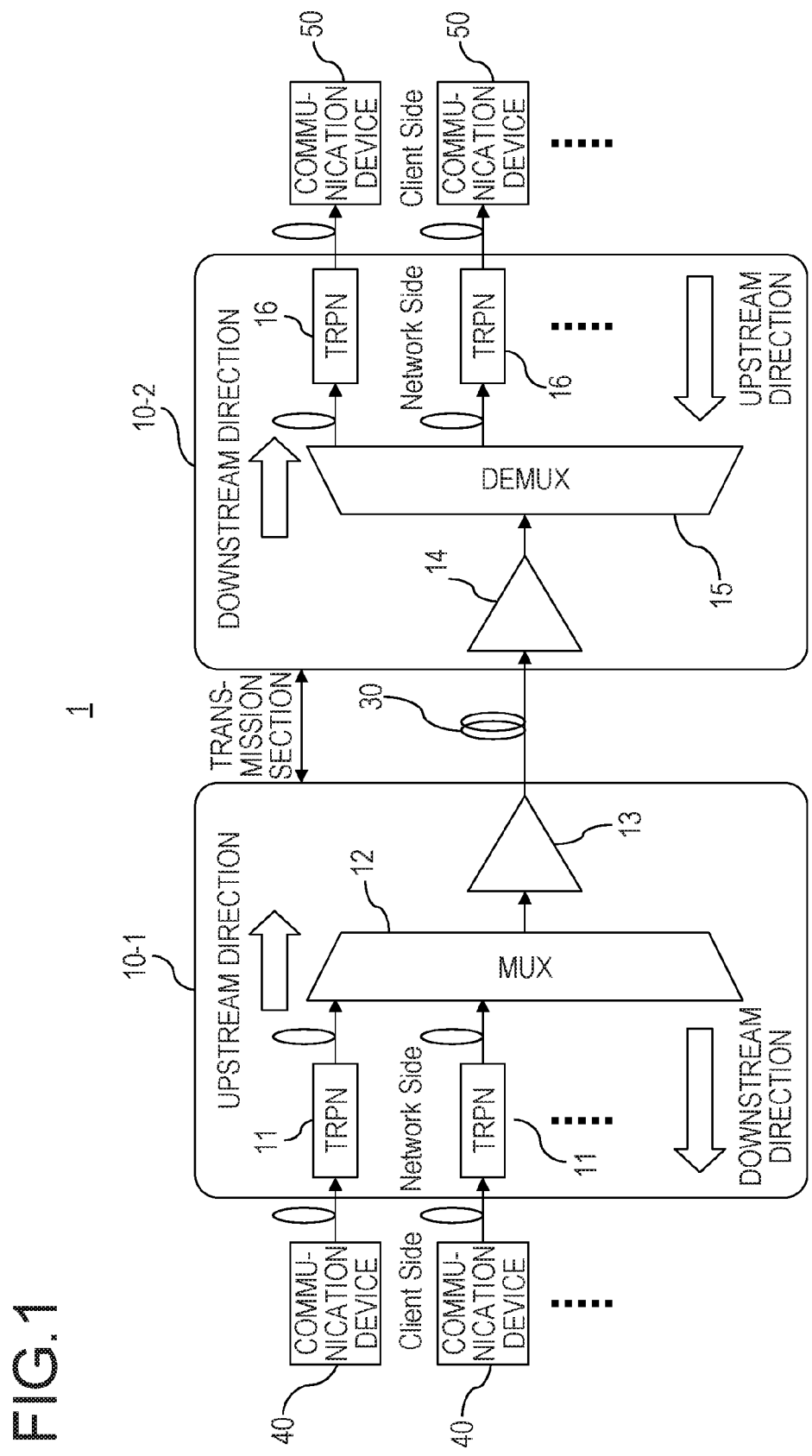
FIG. 1 is a block diagram illustrating an exemplary configuration of a wavelength division multiplexing (WDM) optical network as an example of an optical transmission system.

In an optical power monitoring using the PD, for example, when the optical signal input to the optical receiver is a "multi-channel signal" in which a plurality of wavelengths are multiplexed, the optical power to be monitored is a total optical power of the multi-channel signals.

Therefore, in the VOA control based on the monitoring result obtained by the PD, the optical power of a desired reception wavelength (may be referred to as a "target channel") in the optical receiver may not fall within an appropriate reception range of the optical receiver. In other words, the accuracy of controlling the received optical power of the target channel which is a desired reception wavelength is reduced.

Hereinafter, embodiments of techniques for improving the accuracy of received optical power control will be described with reference to the accompanying drawings. However, the embodiments to be described below are merely illustrative and are not intended to exclude various modifications and applications of techniques not specified below. Further, various exemplary embodiments to be described below may be carried out appropriately in combination. In the drawings used in the following embodiments, portions denoted by the same reference numerals, unless otherwise specified, represent the same or like parts.

FIG. 1 is a block diagram illustrating an exemplary configuration of a wavelength division multiplexing (WDM)

optical network as an example of an optical transmission system. A WDM optical network 1 illustrated in FIG. 1 may include, for example, an optical transmission apparatus 10-1 and an optical transmission apparatus 10-2.

The optical transmission apparatuses 10-1 and 10-2 may be connected, for example, via an optical transmission line 30 to enable an optical communication. The optical transmission line 30 may be an optical fiber transmission line. The optical communication between the optical transmission apparatuses 10-1 and 10-2 may be either a unidirectional or a bidirectional. FIG. 1 illustrates an exemplary configuration focusing on optical communication from the optical transmission apparatus 10-1 to the optical transmission apparatus 10-2.

If the optical transmission apparatuses 10-1 and 10-2 may not be distinguished from each other, it may be simply referred to as an "optical transmission apparatus 10." The optical transmission apparatus 10 is an example of an element (network element NE) of the WDM optical network 1. An optical transmitting station, an optical receiving station, an optical relay station, an optical add-drop station such as a reconfigurable optical add/drop multiplexer (ROADM) or the like may be applicable to the NE 10. A "station" may be referred to as a "node."

By way of example, in FIG. 1, the NE 10-1 may correspond to an optical transmitting station (optical transmitting node), and the NE 10-2 may correspond to an optical receiving station (optical receiving node).

In the optical transmission line 30 between the NE 10-1 and the NE 10-2, an optical amplifier may be provided appropriately depending on a transmission distance of a WDM optical signal. A node with the optical amplifier may be regarded as corresponding to an optical relay node. Depending on the transmission distance of the WDM optical signal, the optical amplifier may not be provided.

The optical transmission apparatus 10-1 may include, as illustrated in FIG. 1, a plurality of transponders (TRPN) 11 and a wavelength multiplexer (multiplexer: MUX) 12.

Each of the TRPN 11 may be optically connected to a communication device 40 such as a router via an optical fiber. Each of the TRPNs 11 may be optically connected to the MUX 12 via an optical fiber.

The communication device 40 is, for example, a communication device of a client (may be referred to as a "tributary"). A communication device used in Synchronous Digital Hierarchy (SDH), Synchronous Optical Network (SONET), Ethernet (registered trademark) or the like may be applicable to the communication device 40 of the client. Further, a communication device 50 connected to the optical transmission apparatus 10-2 may be similar to the communication device 40.

A signal transmitted from the communication device 40 is converted into an optical signal of a one wavelength (may be referred to as a "channel") after being received by the corresponding TRPN 11, and is input to the MUX 12.

The MUX 12 may be a multiplexing coupler such as a WDM coupler, and generates a WDM optical signal by wavelength-multiplexing the optical signal received from each of the TRPNs 11. The generated WDM optical signal is transmitted to the optical transmission line 30. In the transmission, the WDM optical signal may be amplified to a predetermined transmission optical power by an optical amplifier 13 provided at a rear stage (post-stage) of the MUX 12.

The optical amplifier 13 may be referred to as a "post-amplifier 13" or a "transmission amplifier 13." Depending on the transmission distance of the WDM optical signal, the optical amplifier 13 in the optical transmission apparatus 10-1 may be unnecessary.

The WDM optical signal transmitted to the optical transmission line 30 is received, for example, by the optical transmission apparatus 10-2. The optical transmission apparatus 10-2 may include, as illustrated in FIG. 1, a wavelength demultiplexer (demultiplexer DMUX) 15 and a plurality of TRPNs 16.

At a front stage (pre-stage) of the DMUX 15, an optical amplifier 14 for amplifying the received WDM optical signal may be provided. The optical amplifier 14 may be referred to as a "preamplifier 14" or a "reception amplifier 14." Depending on the transmission distance of the WDM optical signal, the optical amplifier 14 in the optical transmission apparatus 10-2 may be unnecessary.

The DMUX 15 divides the received WDM optical signal for each wavelength and inputs the divided signal to any one of the TRPNs 16. If coherent reception is possible in the TRPNs 16, the DMUX 15 may be, alternatively, an optical splitter for splitting the WDM optical signal. The optical splitter may be a branched coupler.

Each of the TRPNs 16 photoelectrically converts an optical signal input from the DMUX 15 into an electrical signal, and transmits the electrical signal to the communication device 50 of the client.

Although a configuration focusing on the unidirectional communication from the optical transmission apparatus 10-1 to the optical transmission apparatus 10-2 has been illustrated in FIG. 1, the same configuration may be employed for the communication in a reverse direction. In other words, bidirectional communication may be carried out between the optical transmission apparatus 10-1 and the optical transmission apparatus 10-2. Thus, a bidirectional communication may be carried out between the communication device 40 and the communication device 50.

The bidirectional optical communication may be carried out via the optical transmission line 30 provided separately for each of both directions between the optical transmission apparatus 10-1 and the optical transmission apparatus 10-2. For example, a reverse communication from the optical transmission apparatus 10-2 to the optical transmission apparatus 10-1 may be regarded as being implemented by a configuration in which, in FIG. 1, the optical transmission apparatus 10-1 and the optical transmission apparatus 10-2 are replaced with each other.

For convenience, in the bidirectional communication, a direction in which the optical transmission apparatus 10-1 (or 10-2) transmits a WDM optical signal to the optical transmission line 30 may be called an "upstream direction," and a reverse direction may be called a "downstream direction."

Therefore, each of the optical transmission apparatuses 10-1 and 10-2 may include a transmitting system corresponding to the upstream direction and a receiving system corresponding to the downstream direction. For example, in FIG. 1, the TRPNs 11 and the MUX 12 correspond to the transmitting system of the optical transmission apparatus 10-1, and the DMUX 15 and the TRPNs 16 correspond to the receiving system of the optical transmission apparatus 10-2.

In other words, the optical transmission apparatus 10-1 may include, although not illustrated in FIG. 1, the DMUX 15 and the TRPNs 16 as a receiving system, similarly to the receiving system of the optical transmission apparatus 10-2.

Further, the optical transmission apparatus 10-2 may include, although not illustrated in FIG. 1, the t TRPNs 11 and the MUX 12 as a transmitting system, similarly to the transmitting system of the optical transmission apparatus 10-1.

However, the TRPNs 11 (or TRPNs 16) may be shared both for the transmitting and receiving system. In other words, the TRPNs 11 and 16 may have the same configuration (e.g., as transmitting and receiving units).

The receiving unit of the TRPNs 11 (or TRPNs 16) may have a configuration of a "single channel reception" or a "multi-channel reception." In the "single channel reception," the optical signal of a desired reception channel (may be referred to as a "target channel") among a plurality of channels of the received WDM optical signal is selectively input to the receiving unit.

In contrast, in the multi-channel reception, the optical signals of a plurality of channels, including the target channel, of the received WDM optical signal may be input to the receiving unit. In the receiving unit, even though the optical signals of a plurality of channels are input, a signal component of the target channel can be detected by coherent detection.

For example, a coherent detection, as described later, detects a beat signal according to optical interference by mixing local oscillation light of a desired reception wavelength with the received optical signal including a plurality of channels. The beat signal is electric field complex information of light corresponding to the desired reception wavelength.

Figure 2:
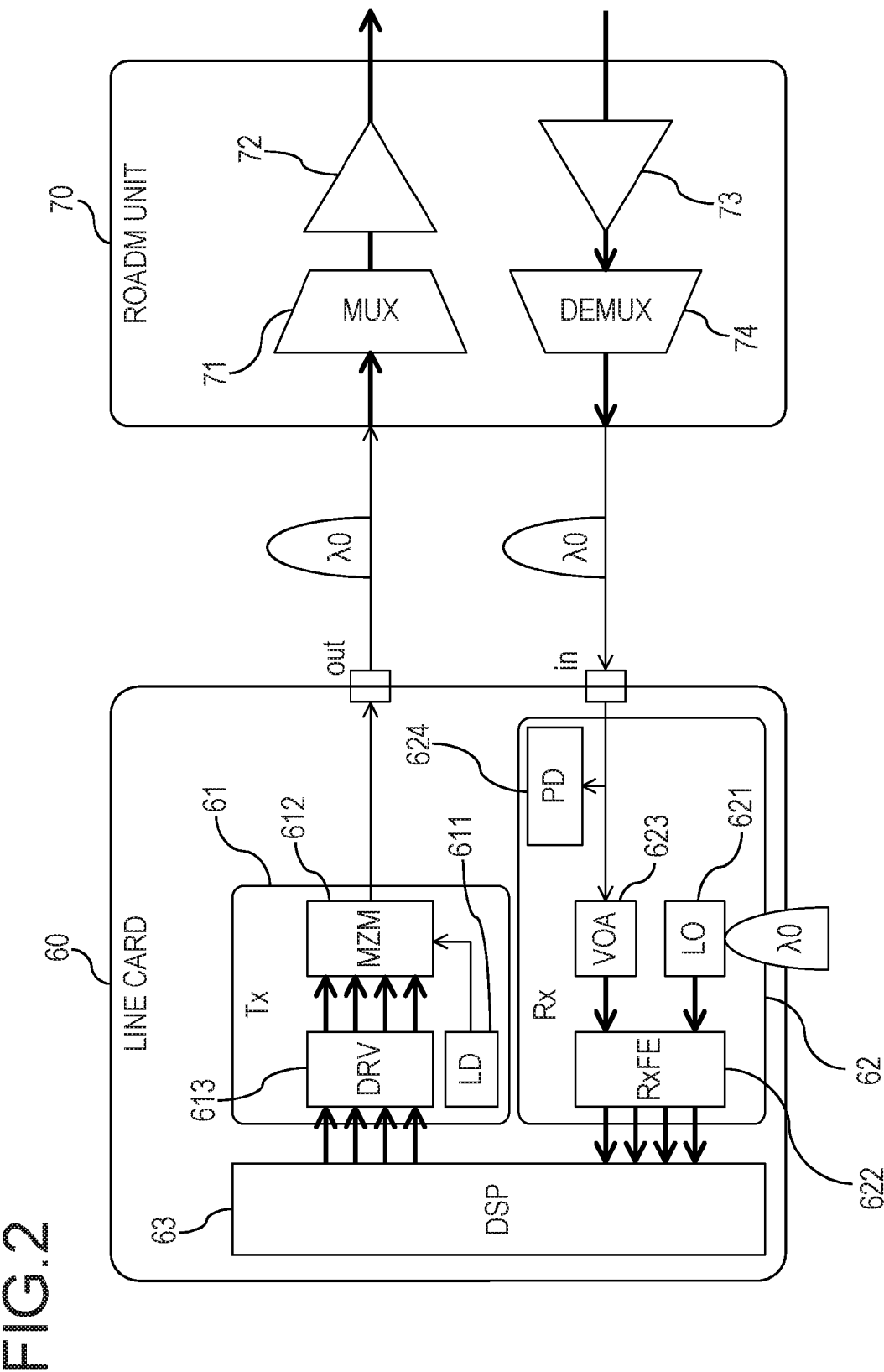
FIG. 2 is a block diagram illustrating an exemplary configuration of an optical transmission apparatus having a single channel reception configuration.
Figure 3:
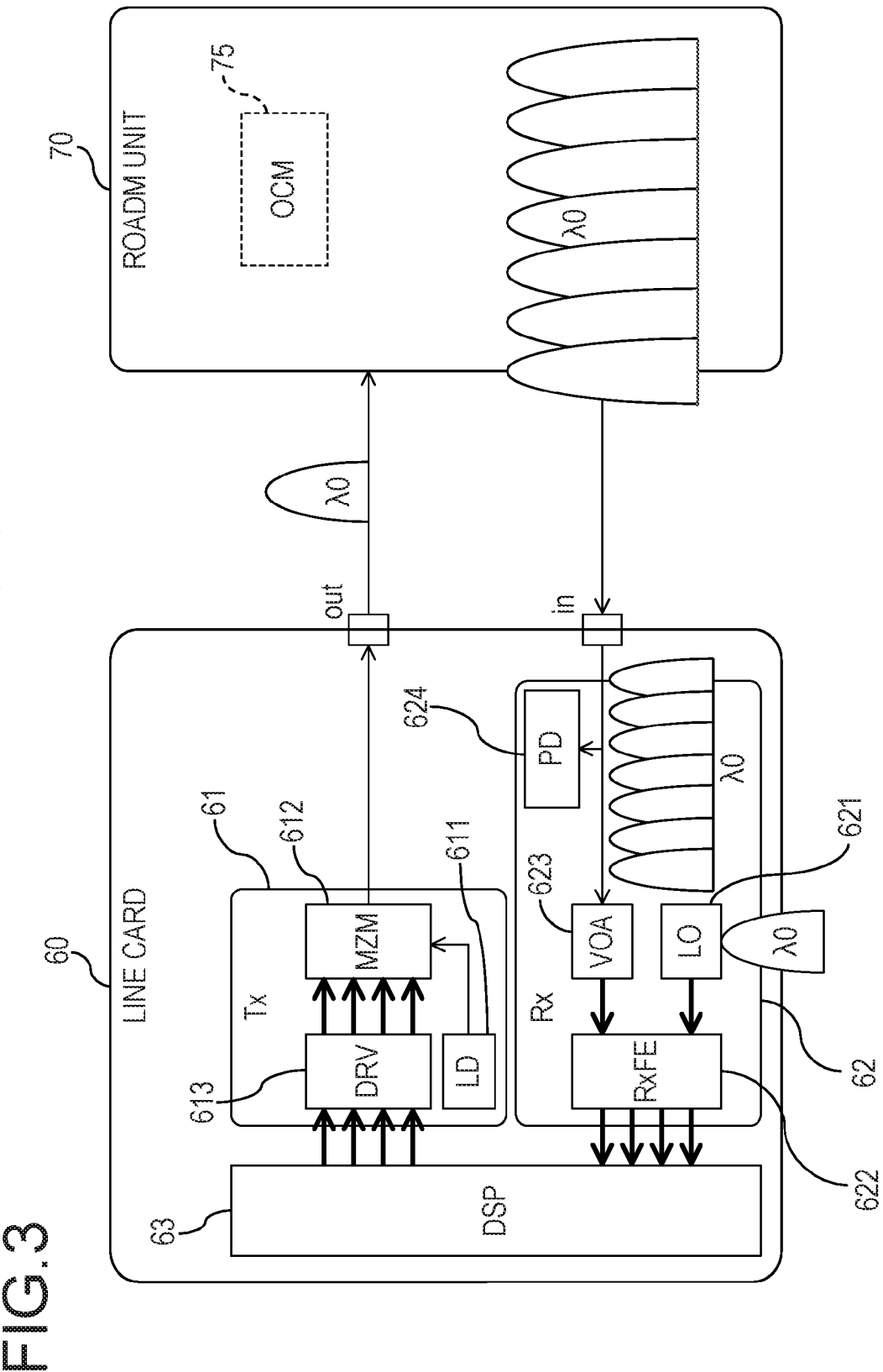
FIG. 3 is a block diagram illustrating an exemplary configuration of an optical transmission apparatus having a multi-channel reception configuration.

FIG. 2 illustrates an exemplary configuration of the optical transmission apparatus 10 having a single channel reception configuration. FIG. 3 illustrates an exemplary configuration of the optical transmission apparatus 10 having a multi-channel reception configuration. The optical transmission apparatus 10 illustrated in FIGS. 2 and 3 is, for example, a ROADM, and may include an optical transmission/reception block 60 and a ROADM unit 70.

The optical transmission/reception block 60 illustrated in FIGS. 2 and 3 may be implemented by a "line card 60." The line card 60 may be regarded as corresponding to the TRPNs 11 (or TRPNs 16) as described above, or may be regarded as corresponding to a function (or element) of the TRPNs 11 (or TRPNs 16).

The optical transmission/reception block 60 may include, for example, an optical transmitter (Tx) 61, an optical receiver (Rx) 62, and a digital signal processor (DSP) 63.

The Tx 61 may include, for example, a light source 611, an optical modulator 612, and a driver 613. By driving the optical modulator 612 by a drive signal corresponding to a transmission data signal generated by the DSP 63, the output light of the light source 611 is modulated by the transmission data signal to generate a transmission modulated signal light.

Further, a semiconductor laser diode (LD) may be applied to the light source 611. The LD may be a LD with a fixed emission wavelength, or a tunable LD with a variable emission wavelength. A Mach-Zehnder optical modulator (MZM) may be applied to the optical modulator 612. To an optical modulation method using the optical modulator, multi-level Phase Shift Keying (PSK), multi-level Quadrature Amplitude Modulation (QAM) or the like may be applied.

As the optical modulation method, multiplexing schemes such as polarization multiplexing for one wavelength or Orthogonal Frequency Division Multiplexing (OFDM) may be combined appropriately. For example, a Dual Polarization-QPSK (DP-QPSK) scheme for mapping the transmission data for each of different polarization components (e.g., X and Y polarization components) may be applied to the optical modulator.

Meanwhile, the Rx 62 may include, for example, a local light source (LO: local oscillator)) 621, and a receiver front-end (RxFE) 622. The LO is an abbreviation for Local Oscillator. The RxFE 622 performs a coherent detection of the received optical signal input from the ROADM unit 70 by using the output light (may be referred to as "local oscillation light") of the local light source 621. The RxFE 622 is an example of an optical receiver for receiving an optical signal.

The optical signal input from the ROADM unit 70 to the Rx 62 is a single channel optical signal in the example of FIG. 2, and a multi-channel optical signal in the example of FIG. 3.

For example, the ROADM unit 70 illustrated in FIG. 2 separates the received WDM optical signal for each channel, and selects and outputs the optical signal of any one channel to the line card 60.

The channel separation may be carried out by using, e.g., a DMUX 74. An arrayed waveguide grating (AWG) or tunable optical filter may be applied to the DMUX 74. The DMUX 74 may be regarded as corresponding to the DMUX 15 illustrated in FIG. 1.

In the ROADM unit 70 of FIG. 2, a pre-amplifier 73 may be provided at a pre-stage of the DMUX 74. The pre-amplifier 73 may be regarded as corresponding to the optical amplifier 14 illustrated in FIG. 1.

Further, a MUX 71 may be provided in the ROADM unit 70 of FIG. 2. At a post-stage of the MUX 71, a post-amplifier 72 may be provided. The MUX 71 and the post-amplifier 72 may be regarded, respectively, as corresponding to the MUX 12 and the optical amplifier 13 illustrated in FIG. 1.

In contrast, the ROADM unit 70 illustrated in FIG. 3 is, for example, wavelength-independent (collarless), and outputs the optical signal of any one of a plurality of channels included in the received WDM optical signal to the Rx 62.

In the Rx 62, even though the optical signals of a plurality of channels are input, a signal component of the target channel can be detected by a coherent detection in the RxFE 622.

For example, even though the optical signal is input to the RxFE 622 of the Rx 62 in a state where a plurality of channels are adjacent, it is possible to cut out signal components of a limited frequency range centered at the frequency of the local oscillation light.

Therefore, the DSP 63 may perform a signal processing of the target channel without being affected by adjacent channels. Further, since the multi-channel optical signal is allowed to be input to the Rx 62, the ROADM unit 70 does not need to be provided with an expensive channel separation function using the AWG or tunable optical filter and the like.

Further, in recent optical communication technology, in order to improve the frequency utilization efficiency in a WDM transmission band, a channel spacing of the WDM optical signal may be narrowed as much as possible by using a Nyquist filter or the like on the optical transmitting side in order to form high-density channels. The WDM optical signal with high-density channels may be referred to as a "super-channel" signal.

In the single channel reception, it is difficult to realize filter characteristics capable of cutting out a signal component of the target channel in a limited manner from the super-channel signal. In contrast, in the multi-channel reception, as described above, by using a coherent detection, it is possible to perform a signal processing by cutting out a signal component of the target channel in a limited manner even from the super-channel signal.

Meanwhile, the input optical power level to the RxFE 622 has an appropriate range (may be referred to as a "reception range") in accordance with the reception characteristics of the RxFE 622. The reception characteristics of the RxFE 622 may be considered to be determined, for example, according to the characteristics of a transimpedance amplifier (TIA) or a photoelectric converter such as a photodetector or photodiode (PD) provided in the RxFE 622. An example of the characteristics of the PD is a photoelectric conversion efficiency, and an example of the characteristics of the TIA is a current-voltage conversion efficiency.

In order for an input optical power level to the RxFE 622 to fall within an appropriate reception range, a variable optical attenuator (VOA) 623 may be provided at a pre-stage of the RxFE 622 as illustrated in FIGS. 2 and 3.

The VOA 623 adjusts the power level of the optical signal input to the RxFE 622 of the Rx 62 from the ROADM unit 70 by controlling the optical attenuation amount (may be referred to as "VOA loss").

The VOA loss may be controlled, for example, based on the result of monitoring (may be referred to as "detecting" or "measuring") an output optical power level from the ROADM unit 70 by a PD 624. For example, the VOA loss may be controlled such that the optical power level monitored by the PD 624 becomes an appropriate power level to fall within the reception range of the RxFE 622. Further, the PD 624 may be referred to as a "monitor PD 624" or "monitor 624."

However, the control of the VOA loss based on the monitoring result by the PD 624 located at a pre-stage of the VOA 623 is effective in the single channel reception of FIG. 2, but the error is likely to be large in the multi-channel reception of FIG. 3.

For example, the optical power level detected by the PD 624 is an optical power level of the target channel in the single channel reception, but, in the multi-channel reception, the optical power level detected by the PD 624 is a total optical power level of the multi-channel containing the target channel.

For convenience, the optical power level of the target channel may be referred to as a "target channel power," and the total optical power level of the multi-channel may be referred to as a "total power."

When the VOA loss is controlled based on the total power, it cannot necessarily be said that the target channel power to the RxFE 622 is controlled to an appropriate power level. Therefore, the control error may occur.

Figure 4:
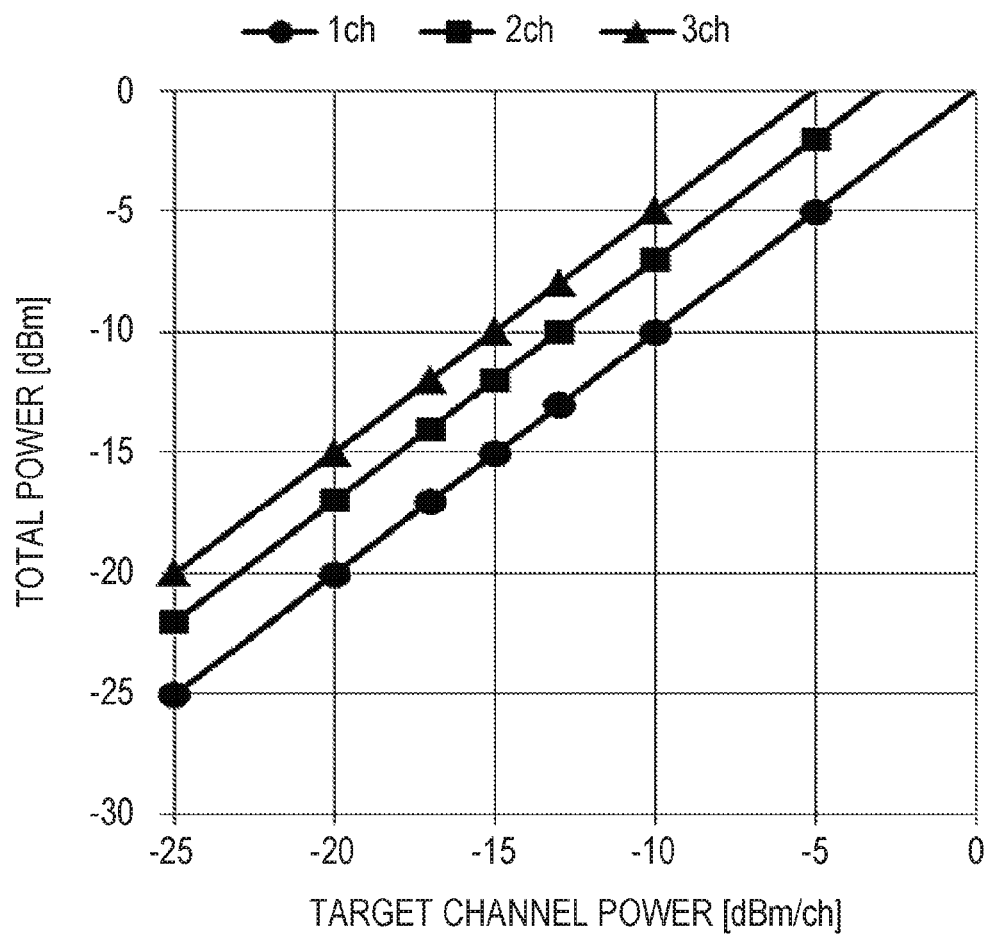
FIG. 4 illustrates an example of a relationship between the target channel power and the total power when the number of receiving channels varies.

As one non-limiting example, FIG. 4 illustrates a relationship between the target channel power (horizontal axis, [dBm/ch]) and the total power (vertical axis, [dBm]) when the number of receiving channels varies. In FIG. 4, for example, when focusing on the target channel power="−10 dBm/ch," the total power of the single channel reception is also "−10 dBm."

In contrast, the total power of the two-channel reception is, for example, about "−7 dBm," and the total power of the three-channel reception is, for example, about "−5 dBm." Thus, the total power tends to increasingly deviate from the target channel power as the number of reception channels increases.

Therefore, in the case of multi-channel reception by the Rx 62 of FIG. 3, when the VOA loss is controlled on the basis of the total power monitored by the PD 624, the control error of the target channel power is likely to increase.

Therefore, in the case of multi-channel reception of FIG. 3, for example, the optical power of each channel may be monitored by an optical channel monitor (OCM) 75 provided in the ROADM unit 70, and the target channel power in the Rx 62 may be estimated by using the monitoring result.

In order to correct the optical power loss from the OCM 75 to the line card 60, the OCM 75 may further monitor the total power of the received WDM optical signal. The monitoring result or information obtained by the OCM 75, for convenience, may be collectively referred to as "monitor power information."

In the line card 60, for example, based on the total power monitored by the PD 624 and the target channel power and the total power monitored by the OCM 75, it is possible to estimate the target channel power at the line card 60.

For example, when the target channel power at the line card 60 is represented by "$P_{LINEtarget}$," the total power at the OCM 75 is represented by "$P_{OCMtotal}$," the target channel power at the OCM 75 is represented by "$P_{OCMtarget}$," and the total power monitored by the PD 624 is represented by "$P_{PDtotal}$," the target channel power can be estimated by Eq. 1 below.

$$P_{LINEtarget} = P_{OCMtarget} - (P_{OCMtotal} - P_{PDtotal}) \qquad [\text{Eq. 1}]$$

By controlling the VOA loss based on the target channel power $P_{LINEtarget}$ at the line card 60 obtained by Eq. 1, it is possible to adjust the target channel power to the RxFE 622 to an appropriate power level even in the multi-channel reception.

Figure 5:
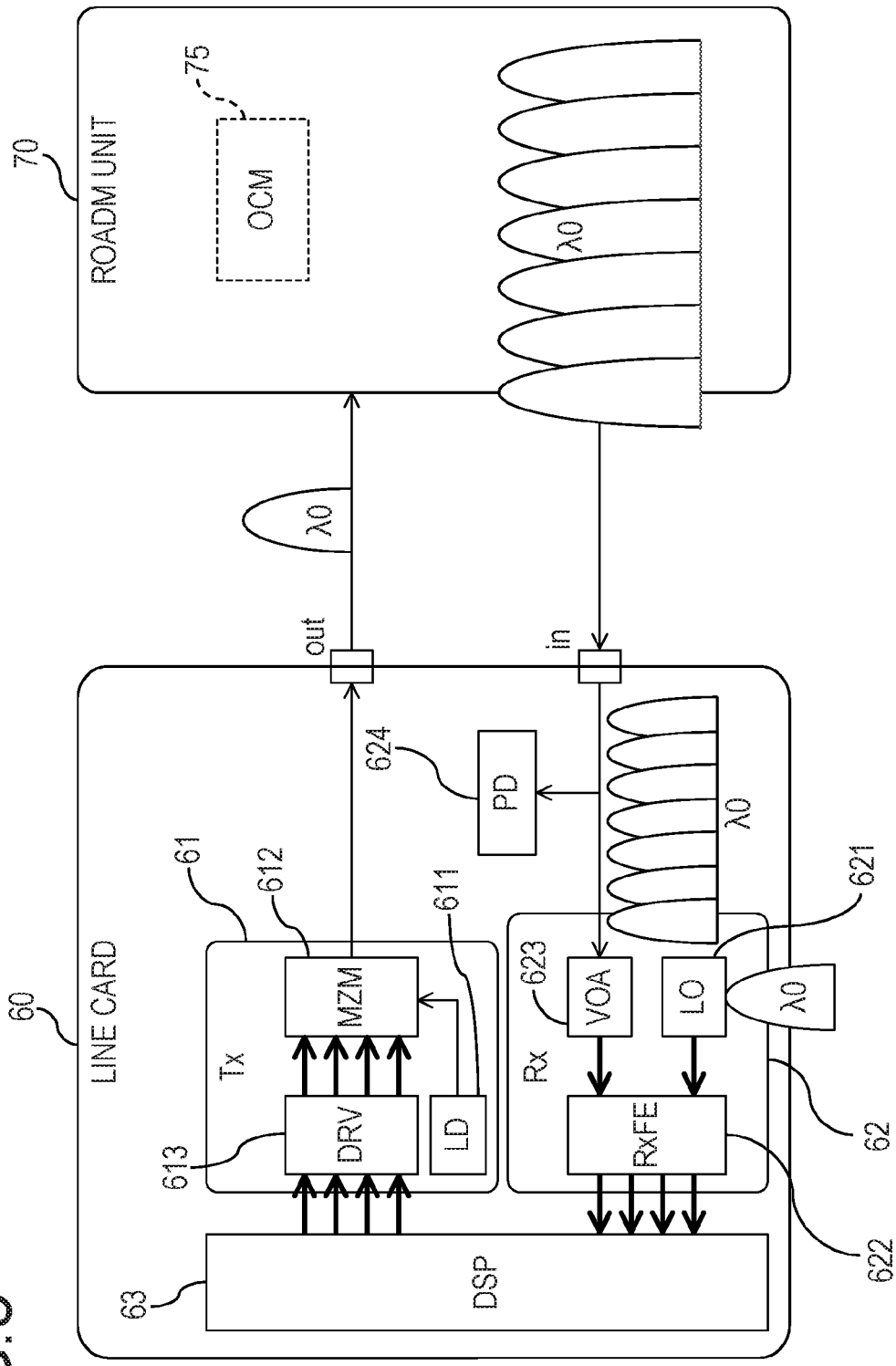
FIG. 5 is a block diagram illustrating a modification of the multi-channel reception configuration illustrated in FIG. 3.
Figure 6:
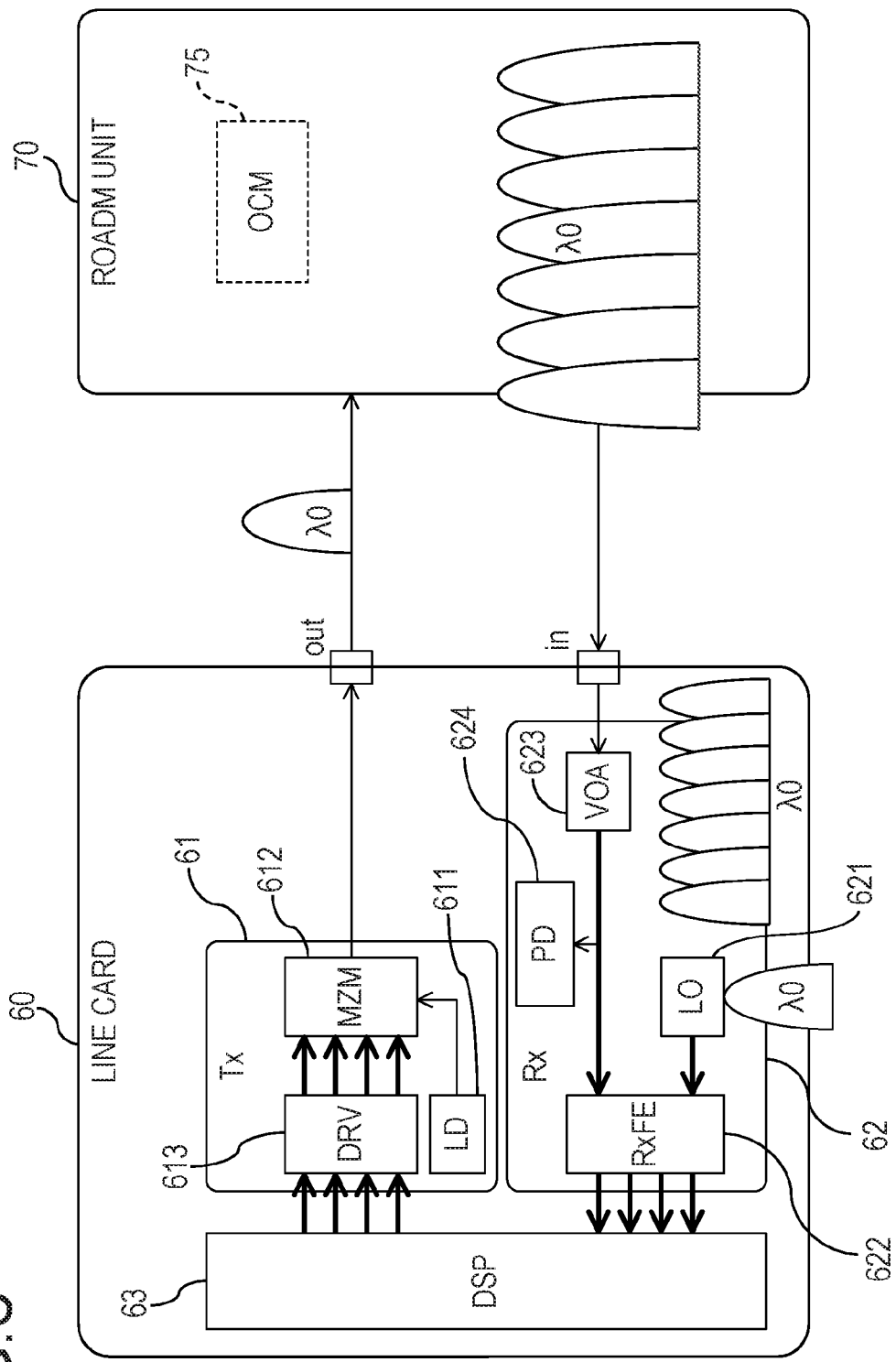
FIG. 6 is a block diagram illustrating a modification of the multi-channel reception configuration illustrated in FIG. 3.

Although it has been illustrated in FIGS. 2 and 3 that the PD 624 is provided inside the Rx 62, for example, as illustrated in FIG. 5, the PD 624 may be provided outside the Rx 62. Further, although it has been illustrated in FIGS. 2 and 3 that the PD 624 is provided at a pre-stage of the VOA 623, for example, as illustrated in FIG. 6, the PD 624 may be provided at a post-stage of the VOA 623. In other words, the PD 624 may be provided on an optical path through which the optical signal is propagated to the RxFE 622.

As described above, in the multi-channel reception configuration illustrated in FIG. 3, it is possible to estimate the target channel power at the line card 60 by using the monitor power information of the OCM 75, and it is possible to control the VOA loss by using the estimated value.

When considering the arrangement of the OCM 75, it is possible to suppress errors caused by the optical power loss between the OCM 75 and the line card 60 by reducing the transmission distance of the optical signal from the OCM 75 to the line card 60. Thus, the OCM 75 is desirably disposed as close as possible to the line card 60.

For example, if one OCM 75 is individually arranged for one line card 60, the transmission distance of the optical signal between the OCM 75 and the line card 60 may be minimized. However, if the number of line cards 60 provided in the optical transmission apparatus 10 increases, arranging the OCM 75 for each line card 60 increases the cost and size of the optical transmission apparatus 10.

Therefore, as illustrated in FIG. 3, it is considered to be practical to arrange the OCM 75 inside the ROADM unit 70. However, if the OCM 75 is arranged in the ROADM unit 70, as described above, the optical power loss in the optical path from the ROADM unit 70 to the line card 60 is generated.

As represented in Eq. 1 described above, even though the optical power loss has been corrected by using the total power monitored by the OCM 75 and the total power monitored by the PD 624 of the line card 60, the measurement errors of the monitor power information may be accumulated. Owing to the accumulation of the measurement errors, an error may occur in the target channel power obtained by Eq. 1. As a result, the control accuracy of the VOA loss may be deteriorated.

Further, when transmitting the information obtained by the OCM 75 from the ROADM unit 70 to the line card 60, a delay may occur. Therefore, limitations may occur in the control speed of the VOA loss.

Therefore, in the embodiments described below, there will be described examples of improving the monitoring accuracy of the target channel power and improving the control accuracy of the VOA loss. For example, in the RxFE 622, by a coherent detection and a photoelectric conversion of the received multi-channel optical signal, it is possible to obtain an electrical signal including a signal component (may be referred to as "complex electric field information") of the target channel in a limited manner.

Therefore, the electrical signal may be used to estimate the target channel power input to the RxFE 622. Since the optical power loss due to the optical path distance between the line card 60 and the ROADM unit 70 is reflected in the estimation result, it is possible to improve the estimation accuracy of the target channel power without depending on the correction using Eq. 1 as described above.

By performing the control of the VOA loss based on the estimation result, it is possible to improve the control accuracy of the VOA loss. Therefore, it is possible to accurately adjust the input optical power level to the RxFE 622 to an appropriate range.

Hereinafter, embodiments of configurations and operations of the Rx 62 capable of improving the estimation accuracy of the target channel power will be described.

First Embodiment

Figure 7:
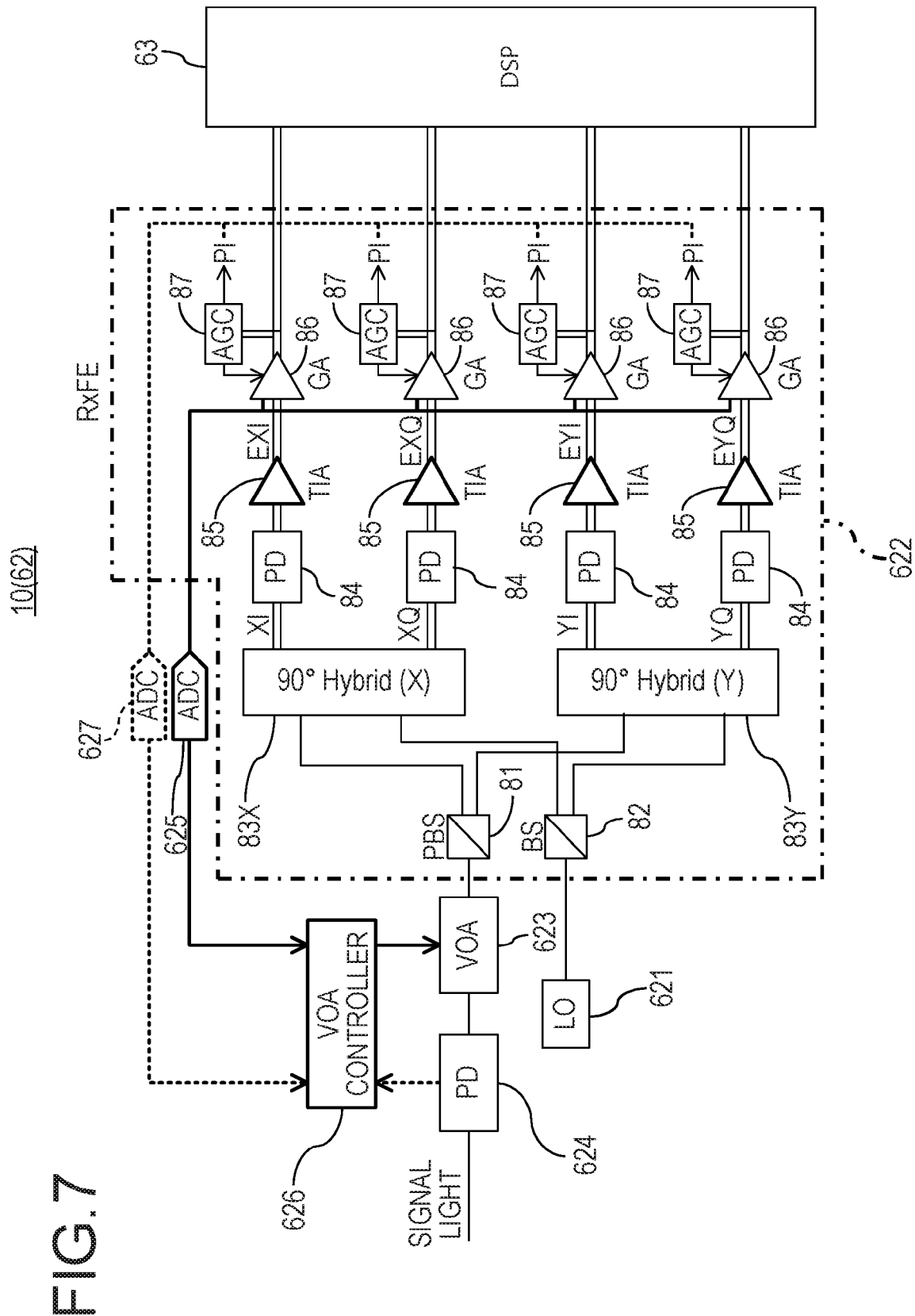
FIG. 7 is a block diagram illustrating an exemplary configuration of an optical receiver according to a first embodiment.

FIG. 7 is a block diagram illustrating an exemplary configuration of the Rx 62 according to a first embodiment. The Rx 62 illustrated in FIG. 7 may include, for example, an analog-digital converter (ADC) 625 and a VOA controller 626 in addition to the local light source 621, the RxFE 622, the VOA 623, and the PD 624 as described above. Further, one or both of the VOA 623 and the PD 624 may be provided inside the RxFE 622 (may be disposed on an optical path through which the signal light propagates). In other words, one or both of the VOA 623 and the PD 624 may be provided inside or outside the RxFE 622.

For example, a polarization-multiplexed multi-channel optical signal may be input to the RxFE 622. In that case, the RxFE 622 may include a polarizing beam splitter (PBS) 81, a beam splitter (BS) 82, 90-degree hybrid mixers 83X and 83Y, a PD 84, a TIA 85, a gain amplifier (GA) 86, and an automatic gain controller (AGC) 87. The PD 84, the TIA 85, the GA 86 and the AGC 87 may be provided as four sets corresponding to four lanes, respectively, which will be described later.

The PBS 81 separates an optical signal input from the VOA 623 for each of different polarization components. The different polarization components are, for example, polarization components orthogonal to each other. One of them may be referred to as an X polarization component and the other may be referred to as a Y polarization component. For example, the X polarization component is input to the 90-degree hybrid mixer 83X located on one side, and the Y polarization component is input to the 90-degree hybrid mixer 83Y located on the other side.

The BS 82 branches the local oscillation light of the LO 621 and inputs the branched lights to the 90-degree hybrid mixers 83X and 83Y, respectively.

The 90-degree hybrid mixer 83X located on one side mixes the X polarization component input from the PBS 81 with the local oscillation light input from the BS 82 in the same phase and different phases (e.g., 90-degree different phases) and causes them to interfere with each other.

Thus, the 90-degree hybrid mixer 83X outputs two systems of optical signals (complex electric field information) of an in-phase (I-phase) component (XI) and a quadrature (Q-phase) component (XQ) for the X polarization component.

Similarly, the 90-degree hybrid mixer 83Y located on the other side mixes the Y polarization component input from the PBS 81 with the local oscillation light input from the BS 82 in the same phase and different phases (e.g., 90-degree different phases) and causes them to interfere with each other.

Thus, the 90-degree hybrid mixer 83Y outputs two systems of optical signals (complex electric field information) of an in-phase (I-phase) component (YI) and a quadrature (Q-phase) component (YQ) for the Y polarization component.

In other words, the 90-degree hybrid mixers 83X and 83Y output optical signals XI, XQ, YI, and YQ of two different I and Q components for each of two different X and Y polarization components. The paths through which complex electric field information of these four systems is propagated may be respectively referred to as "lanes." Each of signals of four lanes is input to the PD 84.

Each of the optical signals XI, XQ, YI, and YQ of four lanes obtained by the 90-degree hybrid mixers 83X and 83Y is converted into a current signal corresponding to the received optical power in the PD 84 of the corresponding lane. Thus, "PD 84" may be paraphrased as "photoelectric converter 84."

The PD 84 may be configured as a "balanced PD." One "balanced PD" includes two PDs for receiving light of a positive phase and a negative phase output from the 90-degree hybrid mixer (83X or 83Y), and differentially outputs the current signal of each PD. In other words, the "balanced PD" demodulates the phase information of the optical signal by differential detection. It is possible to improve the reception characteristics of an optical signal by differential detection. The "balanced PD" may also be referred to as a "balanced receiver."

The four TIAs 85 respectively convert the current signals obtained by the PDs 84 of the corresponding lanes into voltage signals EXI, EXQ, EYI, and EYQ. Further, the current signals obtained by the PDs 84 and the voltage signals obtained by the TIAs 85, for convenience, may be collectively referred to as "electrical signals EXI, EXQ, EYI, and EYQ."

The four GAs 86 may be, respectively, variable gain electric amplifiers to amplify the voltage signals EXI, EXQ, EYI, and EYQ obtained by the TIAs 85 of the corresponding lanes with variable gains. The gain of each of the GAs 86 may be automatically controlled by the corresponding AGC 87.

By way of example, the gain of the GA 86 may be controlled such that the voltage signals of four lanes have the same constant amplitude peak value (absolute value) (i.e., |EXI|=|EXQ|=|EYI|=|EYQ|).

For example, each of the AGCs 87 may monitor the output amplitude of the corresponding GA 86 and control the gain of the GA 86 such that the monitored output amplitude has a predetermined amplitude value. The information of the amplitude being monitored by the AGC 87 may be referred to as "peak indicator (PI)." Therefore, the automatic gain control (AGC) of the GA 86 may be paraphrased as controlling the PI to a predetermined constant value. The PI may be an index indicating whether the AGC of the GA 86 is properly operated by the AGC 87.

The voltage signals EXI, EXQ, EYI, and EYQ amplified by the GAs 86 are input to the DSP 63. The DSP 63 performs digital signal processing on the input voltage signals EXI, EXQ, EYI, and EYQ.

Further, an amplifier for adjusting the output may be provided between the GA 86 and the DSP 63. By adjusting the gain of the amplifier, it is possible to adjust a final output amplitude to the DSP 63.

By the digital signal processing, chromatic dispersion (CD), polarization mode dispersion (PMD), polarization dependent loss (PDL), nonlinear effects and the like, which are factors of degrading the reception characteristics of the optical signal transmitted through the optical transmission line 30 (see, e.g., FIG. 1), can be obtained numerically and compensated.

The "reception characteristics" may be paraphrased as "transmission characteristics" or "signal quality." As an example of an indicator of the "signal quality," Optical Signal to Noise Ratio (OSNR) or Bit Error Rate (BER) may be mentioned.

The digital signal processing may include, for example, analog-digital conversion (ADC), dispersion compensation, sampling phase synchronization, adaptive equalization, frequency offset compensation, carrier phase recovery, error correction decoding and the like.

The digital signal processing may be carried out by a computing device having computing capabilities without being limited to the DSP 63. The computing device may be referred to as a "processor device" or "processor circuit." The computing device may be implemented by using a Field Programmable Gate Array (FPGA), a large-scale integrated circuit (LSI) or the like.

The ADC 625 converts the voltage (GA voltage) of each GA 86, which has been subjected to the automatic gain control (AGC) by the AGC 87, into a digital signal. In FIG. 7, the ADC 625 is common to the GAs 86 of four lanes. However, the ADC 625 may be provided individually for each lane.

In this case, the greater the GA voltage, the greater the gain value of the GA 86. Therefore, the GA voltage may be treated as information equivalent to the gain value of the GA 86.

The GA voltage of the digital signal obtained by the ADC 625, namely, the gain value of the GA 86 (may be referred to as a "monitor gain value") may be provided to the VOA controller 626.

Since the GA 86 is controlled by the AGC 87 such that the PI becomes constant, as the amplitude of the voltage signal input to the GA 86 is greater, the gain value of the GA 86 tends to decrease.

Thus, the VOA controller 626 can estimate the power of the target channel cut out by coherent detection based on the monitor gain value of the GA 86 input from the ADC 625.

Figure 8:
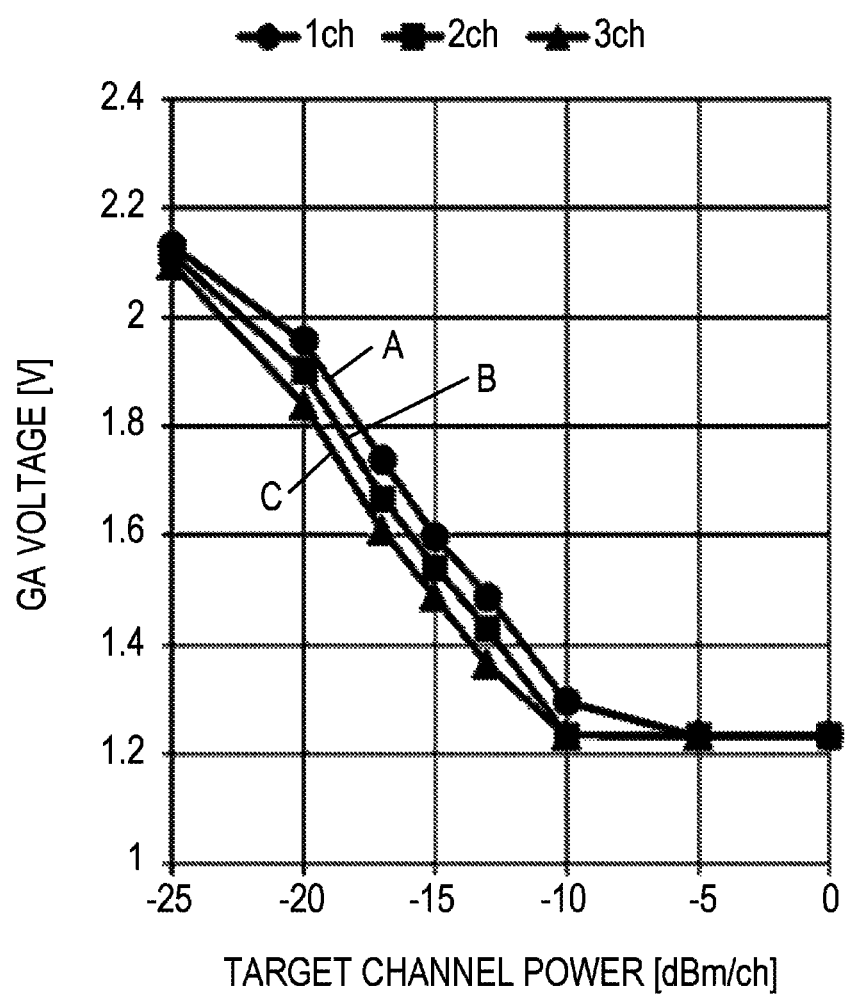
FIG. 8 illustrates an example of a relationship between the target channel power and the voltage of a gain amplifier (GA) when the number of receiving channels varies.

FIG. 8 illustrates an example of a relationship between the target channel power (horizontal axis, [dBm/ch]) and the GA voltage (vertical axis, [V]) when varying the number of receiving channels. In FIG. 8, the relationship indicated by symbols A to C (may be paraphrased as "characteristics") represents a case where the number of receiving channels is 1 to 3.

As can be readily appreciated from FIG. 8, since there is a correlation between the target channel power and the GA voltage, a change in the target channel power can be known from the GA voltage (i.e., a gain value of the GA 86). Further, it can be seen from FIG. 8 that the correlation is almost unchanged even if the number of receiving channels is changed.

Therefore, by monitoring the gain value of the GA 86, the target channel power can be accurately estimated and detected, for example, in the VOA controller 626, without relying on the monitoring information obtained by the OCM 75.

The VOA controller 626 can improve the control accuracy of the VOA loss by controlling the VOA loss based on the target channel power with high estimation accuracy.

Figure 9:
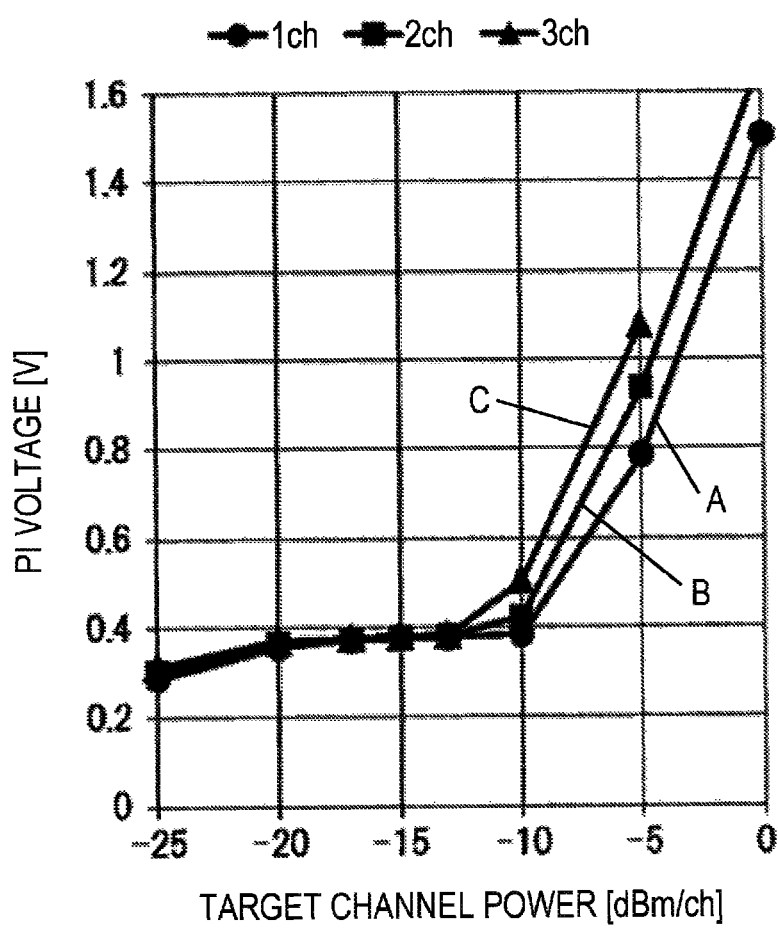
FIG. 9 illustrates an example of a relationship between the target channel power and the peak indicator (PI) when the number of receiving channels varies.

FIG. 9 illustrates an example of a relationship between the target channel power (horizontal axis, [dBm/ch]) and the PI voltage (vertical axis, [V]) when varying the number of receiving channels. In FIG. 9, the relationship indicated by symbols A to C (may be paraphrased as "characteristics") represents a case where the number of receiving channels is 1 to 3.

Since the GA 86 is AGC controlled such that the PI becomes constant, in a power range in which the GA voltage is changed by AGC in FIG. 8 (e.g., between −20 dBm and −10 dBm), the PI becomes constant regardless of the number of receiving channels as illustrated in FIG. 9.

From a different point of view, in a power range in which the PI does not become constant (e.g., smaller than −20 dBm or greater than −10 dBm), a change in the GA voltage by AGC may be determined not to be appropriate. Thus, the GA voltage (gain value) in a power range in which the PI does not become constant is determined to be less reliable, and may not be used for estimation of the target channel power.

For example, the VOA controller 626 may exclude the less reliable GA voltage (gain value) from candidates for use in the estimation of the target channel power by supplementarily using the PI obtained by the AGC 87.

A case of supplementarily using the PI is illustrated by a dotted line in FIG. 7. For example, the PI obtained by the AGC 87 of each lane may be converted into a digital signal by an ADC 627 and provided to the VOA controller 626. Similarly to the ADC 625, the ADC 627 may be provided individually for each of four lanes.

Further, the VOA controller 626 may perform the VOA loss control by supplementarily using the optical power information monitored by the PD 624, instead of or in addition to the PI.

Figure 10:
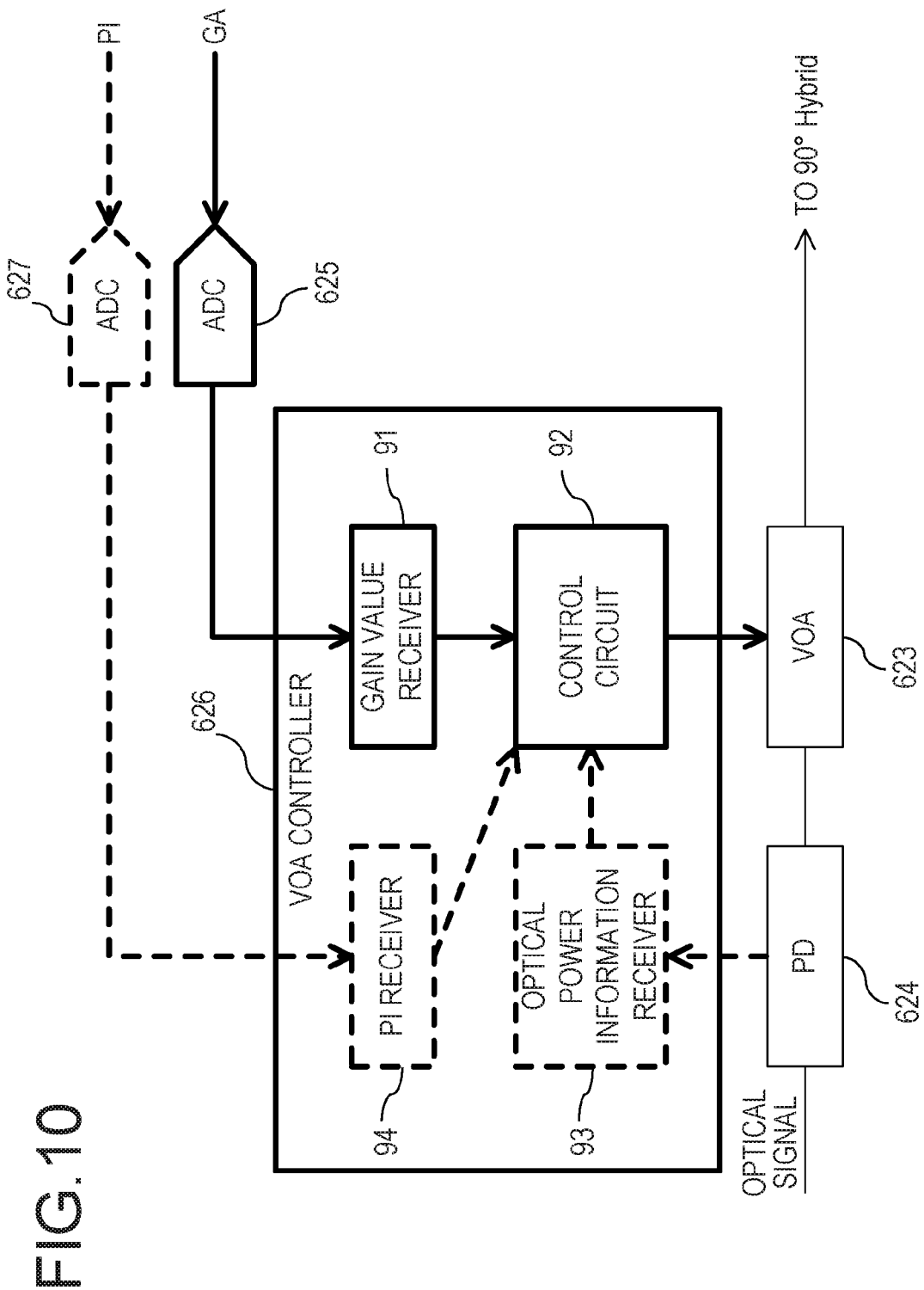
FIG. 10 is a block diagram illustrating an exemplary configuration of a VOA controller illustrated in FIG. 7.

FIG. 10 illustrates an exemplary configuration of the VOA controller 626. The VOA controller 626 illustrated in FIG. 10 may include, for example, a gain value receiver 91 and a control circuit 92. As indicated by a dotted line in FIG. 10, in the case of supplementarily using the information of the PI, the VOA controller 626 may include a PI receiver 94. Further, in the case of supplementarily using the optical power information monitored by the PD 624, the VOA controller 626 may include an optical power information receiver 93.

The gain value receiver 91 receives the monitor gain value of the GA 86 which has been converted into a digital signal in the ADC 625. The received monitor gain value is provided, for example, to the control circuit 92.

The control circuit 92 may control the attenuation amount of the VOA 623 based on the monitor gain value provided from the gain value receiver 91. For example, the control circuit 92 may control the VOA loss such that a difference between the monitor gain value and a control target value of the gain value of the GA 86 becomes smaller.

The optical power information receiver 93 receives an electrical signal (i.e., "optical power information") having an amplitude corresponding to the received optical power monitored by the PD 624. The received optical power information, for example, may be provided to the control circuit 92. The control circuit 92 may supplementarily use the optical power information provided from the optical power information receiver 93 for the control of the VOA loss.

The PI receiver 94 receives the PI obtained by the AGC 87 which has been converted into a digital signal in the ADC 627. The received PI may be provided, for example, to the control circuit 92. The control circuit 92 may supplementarily use the PI provided from the PI receiver 94 for the control of the VOA loss.

The VOA loss control supplementarily using the optical power information will be described later as a second embodiment. Further, the VOA loss control supplementarily using the PI will be described later as a third embodiment. Furthermore, the VOA loss control supplementarily using both the optical power information and the PI will be described later as a fourth embodiment.

Operation Example of First Embodiment

Next, an operation example of the VOA controller 626 according to the first embodiment will be described with reference to a flowchart illustrated in FIG. 11.

Figure 11:
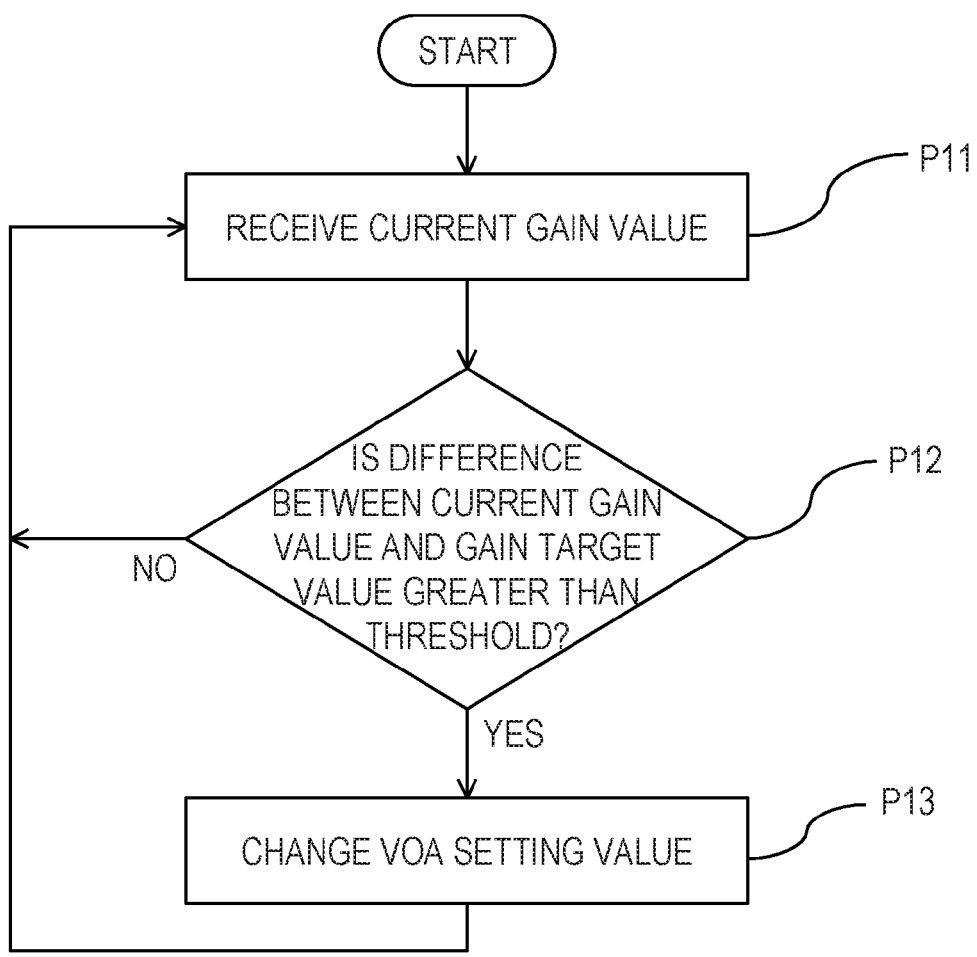
FIG. 11 is a flowchart illustrating an operation example of the VOA controller illustrated in FIG. 7 according to the first embodiment.

As illustrated in FIG. 11, the VOA controller 626 receives the current gain value (monitor gain value) of each of the GAs 86 of four lanes by the gain value receiver 91 (operation P11). Each monitor gain value received by the gain value receiver 91 is provided to the control circuit 92.

The control circuit 92 may calculate an average value of the monitor gain values of the respective lanes provided from the gain value receiver 91, for example, by Eq. 2 below.

$$Gain_{cur} = \frac{1}{4}\sum_{i=1}^{4} Gain_i \qquad \text{[Eq. 2]}$$

In Eq. 2, the Gain$_i$ (i=1, 2, 3 or 4) represents the gain value of one of four lanes (XI, XQ, YI, and YQ). Thus, the gain values Gain$_i$ of four lanes, for convenience, may be denoted by $G_{XI}$, $G_{XQ}$, $G_{YI}$, and $G_{YQ}$.

By averaging the monitor gain values, it is possible to reduce the influence of variations that may occur in the X polarization component and the Y polarization component. The lanes targeted for averaging the gain values may not be a total of four lanes, and may be limited to some of the lanes. For example, among the gain values of four lanes, the in-phase (I) components $G_{XI}$ and $G_{YI}$ or the quadrature (Q) components $G_{XQ}$ and $G_{YQ}$ of only two lanes may be selected and averaged.

Further, for example, if the polarization dependent loss (PDL) of the received optical signal is negligible, subsequent processing may be performed by using the monitor gain value of one of the lanes.

For example, as expressed in Eq. 3 below, the control circuit 92 calculates a difference between a current gain value Gain$_{cur}$ obtained by averaging and a control target value Gain$_{target}$ of the gain value, and determines whether an absolute value of the difference is greater than a predetermined threshold TH$_{Gain}$ (operation P12).

$$|Gain_{cur} - Gain_{target}| > TH_{Gain} \qquad \text{[Eq. 3]}$$

The threshold TH$_{Gain}$ and the control target value Gain$_{target}$ of the gain value may be stored, for example, in a memory (not illustrated) of the control circuit 92.

As a result of the threshold determination, if the difference is equal to or less than the threshold TH$_{Gain}$ (NO in operation P12), the control circuit 92 may return to operation P11 without controlling the VOA loss. In the meantime, if the difference is greater than the threshold TH$_{Gain}$ (YES in operation P12), the control circuit 92 may control the VOA loss such that the difference becomes smaller (operation P13).

For example, a feedback control such as Proportional-Integral-Derivative (PID) control may be applied to the control of the VOA loss. As a non-limiting example, the control circuit 92 may perform a proportional control or a step control on the VOA loss.

(Proportional Control)

In the proportional control, the control circuit 92 may calculate an attenuation amount Att$_{new}$ to be newly set in the VOA 623, for example, by Eq. 4 below.

$$Att_{new} = Att_{prev} - \frac{1}{K_{Gain}} \cdot (Gain_{cur} - Gain_{target}) \qquad \text{[Eq. 4]}$$

In Eq. 4, "Att$_{prev}$" represents an attenuation amount (VOA loss) previously set in the VOA 623, and "K$_{Gain}$" represents a proportional constant.

(Step Control)

In the step control, the control circuit 92 may calculate an attenuation amount Att$_{new}$ to be newly set in the VOA 623, for example, by Eq. 5 below.

$$Att_{new} = Att_{prev} - \text{sign}(Gain_{cur} - Gain_{target}) \cdot Att_{Gain} \qquad \text{[Eq. 5]}$$

In Eq. 5, "sign( )" represents a function of extracting a sign, and "Att$_{Gain}$" represents an attenuation amount to be changed in one step.

After setting the new VOA loss Att$_{new}$, the control circuit 92 may return to operation P11. As described above, the control circuit 92 adjusts the attenuation amount of the VOA 623 such that the gain value of the GA 86 approaches the control target value. Accordingly, it is possible to accurately adjust the input optical power level to the RxFE 622 to an appropriate range.

Second Embodiment

Next, an operation example of the VOA controller 626 according to the second embodiment will be described with reference to a flowchart illustrated in FIG. 12. In the second embodiment, the VOA loss is controlled by supplementarily using the optical power information monitored by the PD 624.

Figure 12:
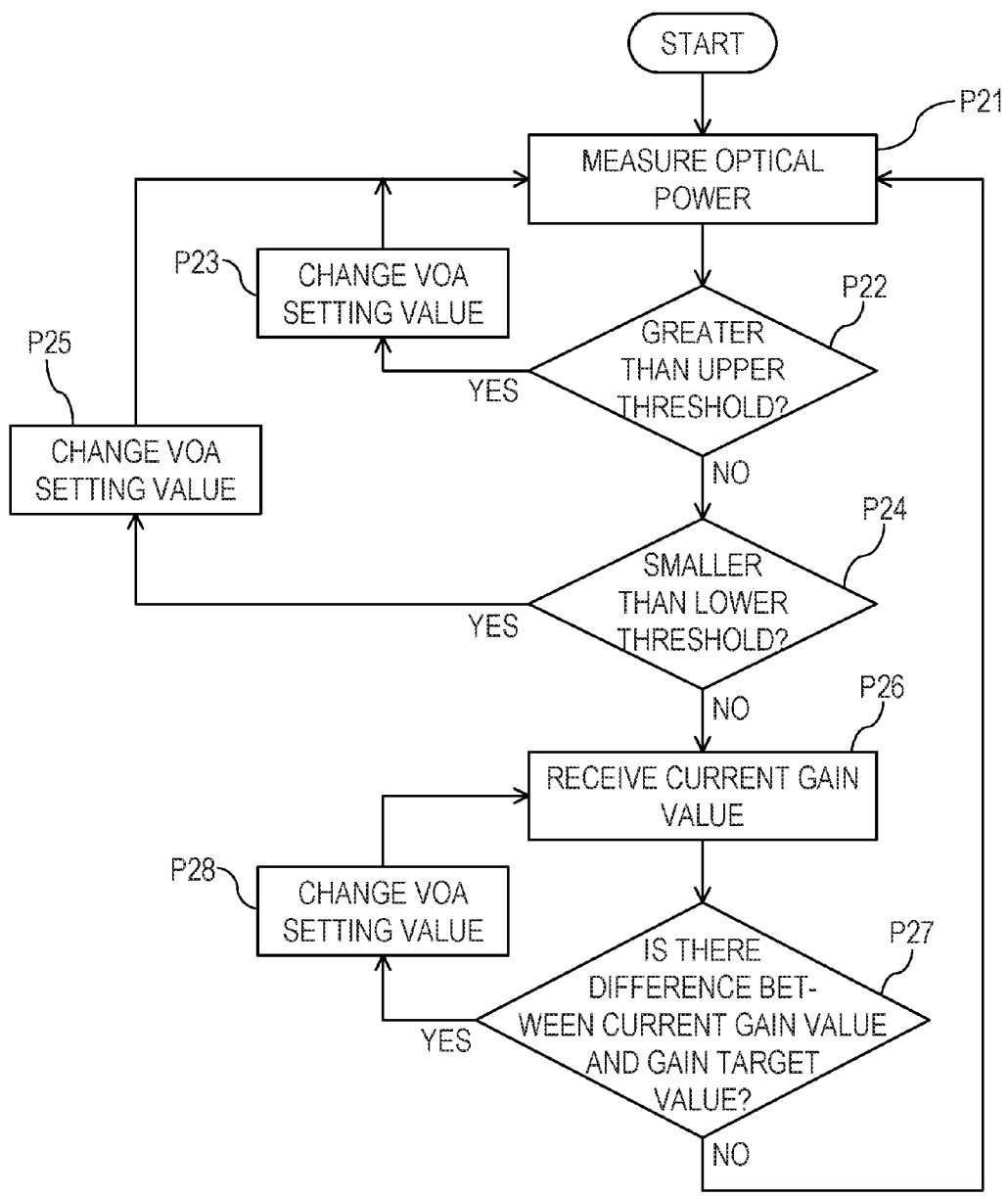
FIG. 12 is a flowchart illustrating an operation example of the VOA controller illustrated in FIG. 7 according to a second embodiment.

As illustrated in FIG. 12, the optical power information receiver 93 of the VOA controller 626 receives the current optical power information monitored by the PD 624 (operation P21). The received optical power information is provided to the control circuit 92.

The control circuit 92, as expressed in Eq. 6 below, compares the optical power information provided from the optical power information receiver 93 with a predetermined upper limit threshold, and determines whether current optical power information $PD_{cur}$ is greater than an upper threshold $TH_{PD\_upper}$ (operation P22).

$$PD_{cur} > TH_{PD\_upper} \quad\quad [\text{Eq. 6}]$$

As a result of the determination, if the optical power information is greater than the upper threshold (YES in operation P22), the control circuit 92 may increase and control the VOA loss such that light having power exceeding the upper limit of the reception range is not input to the RxFE 622 (operation P23). Accordingly, it is possible to prevent the RxFE 622 from malfunctioning or being damaged due to light of excessive power input to the RxFE 622.

In order to prevent the breakage or failure of the RxFE 622, the VOA loss may be set to a maximum value in advance as an initial value. In that case, the control circuit 92 may not change the VOA loss even if the optical power information is determined to be greater than the upper threshold. In other words, the VOA loss may be maintained at the maximum value.

In the meantime, if the current optical power information is equal to or less than the upper threshold (NO in operation P22), the control circuit 92 may further determine whether the current optical power information $PD_{cur}$ is smaller than a lower threshold $TH_{PD\_lower}$ as expressed in Eq. 7 below (operation P24).

$$PD_{cur} < TH_{PD\_lower} \quad\quad [\text{Eq. 7}]$$

As a result of the determination, if the current optical power information is smaller than the lower threshold (YES in operation P24), the control circuit 92 may decrease and control the VOA loss, for example, such that the optical power sufficient to properly carry out the coherent detection is input to the RxFE 622 (operation P25).

The above-described operations P21 to P25 may be regarded as an example of the control of the VOA loss in order for the optical power information monitored by the PD 624 to fall between the upper and lower limits of the reception range of the RxFE 622.

Because the input optical power to the PD 624 does not meet a minimum reception level of the PD 624, in some cases, the optical power information may not be received by the optical power information receiver 93. Therefore, even if the input optical power is the smallest power that can be assumed, the initial value of the VOA loss may be set so as to obtain the optical power sufficient to enable the AGC by the AGC 87. In this case, even though the optical power information obtained from the PD 624 is below the lower threshold, the control circuit 92 may return to operation P21 without changing the VOA loss (i.e., by bypassing operation P25).

The upper and lower thresholds of the optical power information may be stored, for example, in a memory (not illustrated) of the control circuit 92. The processing sequence of operations P22 and P24 of the threshold determination using the upper and lower thresholds may be reversed. Further, the threshold determination may be performed by using only one of the upper and lower thresholds.

As a result of the determination in operation P24, if the current optical power information is equal to or greater than the lower threshold (NO in operation P24), the control circuit 92 may control the VOA loss based on the monitor gain value of the GA 86 in the same manner as the first embodiment (operations P11 to P13 of FIG. 11).

For example, when receiving the current gain values (monitor gain values) of the GAs 86 of four lanes from the gain value receiver 91 (operation P26), the control circuit 92 may calculate an average value of the monitor gain values of the respective lanes in the same manner as the first embodiment, for example, by Eq. 8 below.

$$Gain_{cur} = \frac{1}{4}\sum_{i=1}^{4} Gain_i \quad\quad [\text{Eq. 8}]$$

As in the first embodiment, the lanes targeted for averaging the gain values may not be a total of four lanes, and may be limited to some of the lanes. Further, for example, if the PDL of the received optical signal is negligible, subsequent processing may be performed by using the monitor gain value of one of the lanes.

Similarly to the first embodiment, for example, as expressed in Eq. 9 below, the control circuit 92 calculates a difference between a current gain value $Gain_{cur}$ obtained by averaging and a control target value $Gain_{target}$, and determines whether an absolute value of the difference is greater than a predetermined threshold $TH_{Gain}$ (operation P27).

$$Gain_{cur} - Gain_{target} > TH_{Gain} \quad\quad [\text{Eq. 9}]$$

As in the first embodiment, the threshold $TH_{Gain}$ and the control target value $Gain_{target}$ of the gain value may be stored, for example, in a memory (not illustrated) of the control circuit 92.

As a result of the threshold determination, if the difference is equal to or less than the threshold $TH_{Gain}$ (NO in operation P27), the control circuit 92 may return to operation P21 without controlling the VOA loss. On the other hand, if the difference is greater than the threshold $TH_{Gain}$ (YES in operation P27), similarly to the first embodiment, the control circuit 92 may control the VOA loss such that the difference becomes smaller (operation P28).

Similarly to the first embodiment, a feedback control such as PID control may be applied to the control of the VOA loss. As a non-limiting example and similarly to the first embodiment, the control circuit 92 may perform a proportional control using Eq. 4 or a step control using Eq. 5 on the VOA loss.

As described above, the control circuit 92 adjusts the attenuation amount of the VOA 623 such that the gain value of the GA 86 approaches the control target value. Accordingly, it is possible to accurately adjust the input optical power level to the RxFE 622 to an appropriate range.

As described above, according to the second embodiment, in addition to the same effects as those obtained by the first embodiment, by the determination processing using the lower threshold of the optical power information, it is possible to prevent the AGC from being performed unnecessarily while there is no input of an optical signal. Therefore, it is possible to reduce the power consumption of the Rx 62, thereby in turn reducing the power consumption of the optical transmission apparatus 10. In addition, by the determination processing using the upper threshold of the optical power information, it is possible to prevent the breakage or failure of the RxFE 622 caused by an excessive optical input.

Third Embodiment

Next, an operation example of the VOA controller 626 according to the third embodiment will be described with reference to a flowchart illustrated in FIG. 13. In the third embodiment, the VOA loss is controlled by supplementarily using the PI obtained by the AGC 87.

Figure 13:
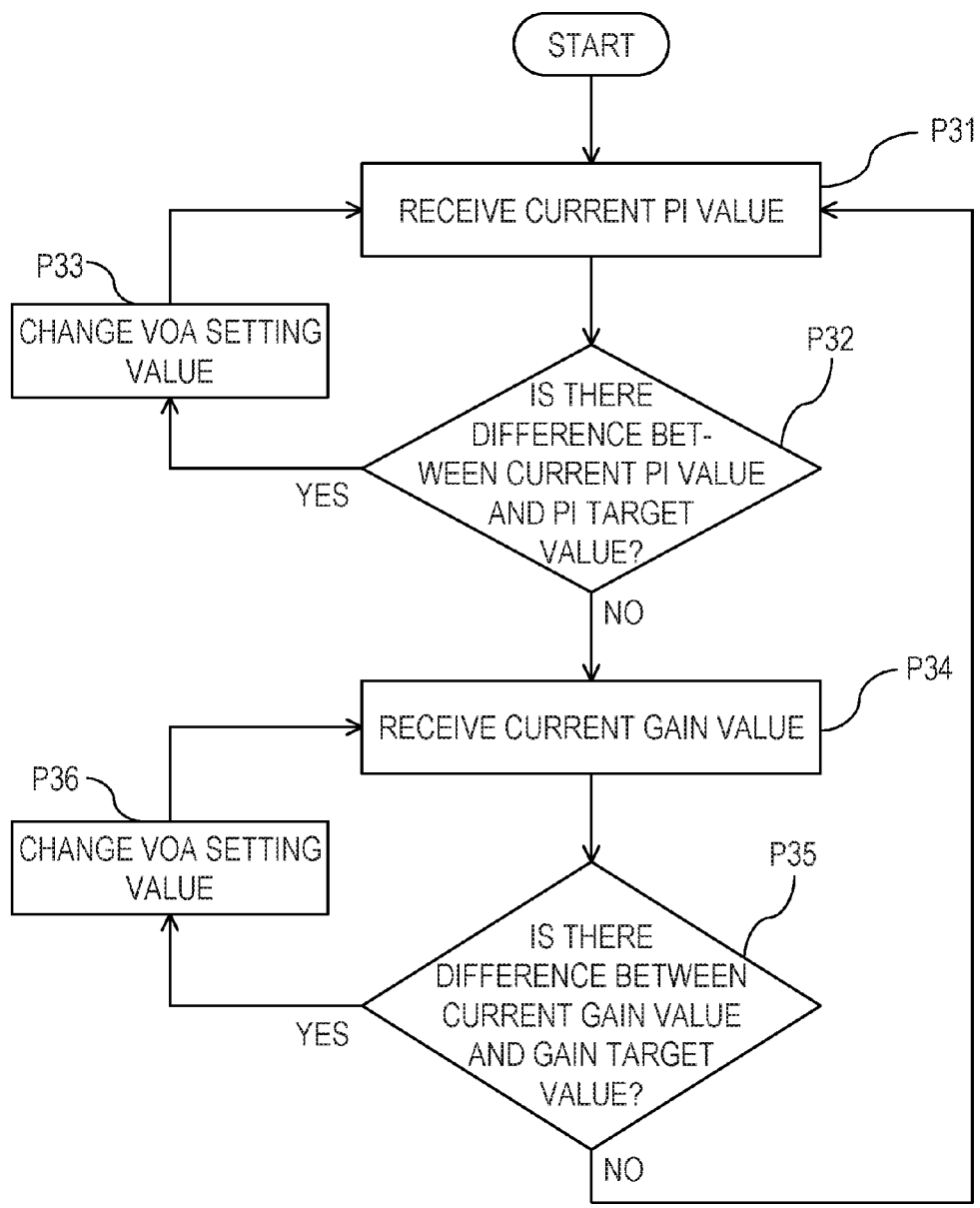
FIG. 13 is a flowchart illustrating an operation example of the VOA controller illustrated in FIG. 7 according to a third embodiment.

As illustrated in FIG. 13, the PI receiver 94 of the VOA controller 626 receives the current PI values in the AGCs 87 of four lanes (operation P31). The PI values received by the PI receiver 94 are provided to the control circuit 92.

The control circuit 92 may calculate an average value of the PI values of the respective lanes provided from the PI receiver 94, for example, by Eq. 10 below.

$$PI_{cur} = \frac{1}{4}\sum_{i=1}^{4} PI_i \qquad [\text{Eq. 10}]$$

In Eq. 10, $PI_i$ (i=1, 2, 3 or 4) represents the PI value of one of four lanes (XI, XQ, YI, and YQ). Thus, the PI values $PI_i$ of four lanes, for convenience, may be denoted by $PI_{XI}$, $PI_{XQ}$, $PI_{YI}$, and $PI_{YQ}$.

By averaging the PI values, it is possible to reduce the influence of variations that may occur in the X polarization component and the Y polarization component. The lanes targeted for averaging the PI values may not be a total of four lanes, and may be limited to some of the lanes.

For example, among the PI values of four lanes, the in-phase (I) components $PI_{XI}$ and $PI_{YI}$ or the quadrature (Q) components $PI_{XQ}$ and $PI_{YQ}$ of only two lanes may be selected and averaged.

Further, for example, if the PDL of the received optical signal is negligible, subsequent processing may be performed by using the PI value of one of the lanes.

For example, as expressed in Eq. 11 below, the control circuit 92 calculates a difference between a current PI value $PI_{cur}$ obtained by averaging and a control target value $PI_{target}$ of the PI value, and determines whether an absolute value of the difference is greater than a predetermined threshold $TH_{PI}$ (operation P32). In other words, the control circuit 92 determines whether the current PI value falls within an appropriate setting range.

$$|PI_{cur} - PI_{target}| > TH_{PI} \qquad [\text{Eq. 11}]$$

The threshold $TH_{PI}$ and the control target value $PI_{target}$ of the PI value may be stored, for example, in a memory (not illustrated) of the control circuit 92.

As a result of the threshold determination, if the difference is greater than the threshold $TH_{PI}$ (YES in operation P32), the control circuit 92 may control the VOA loss such that the difference becomes smaller (operation P33) and return to operation P31.

In other words, if the current PI value is out of the appropriate setting range, as described above with reference to FIG. 9, the control circuit 92 may determine that the gain value of the GA 86 at the PI value is unreliable. Thus, the control circuit 92 may control the VOA loss until the PI value falls within the appropriate setting range.

For example, a feedback control such as PID control may be applied to the control of the VOA loss. As a non-limiting example, the control circuit 92 may perform proportional control or step control on the VOA loss.

(Proportional Control)

In the proportional control, the control circuit 92 may calculate an attenuation amount $Att_{new}$ to be newly set in the VOA 623, for example, by Eq. 12 below.

$$Att_{new} = Att_{prev} - \frac{1}{K_{PI}} \cdot (PI_{cur} - PI_{target}) \qquad [\text{Eq. 12}]$$

In Eq. 12, "$Att_{new}$" represents an attenuation amount to be newly set in the VOA 623, "$Att_{prev}$" represents an attenuation amount previously set in the VOA 623, and "$K_{PI}$" represents a proportional constant.

(Step Control)

In the step control, the control circuit 92 may calculate an attenuation amount $Att_{new}$ to be newly set in the VOA 623, for example, by Eq. 13 below.

$$Att_{new} = Att_{prev} - \text{sign}(PI_{cur} - PI_{target}) \cdot Att_{PI} \qquad [\text{Eq. 13}]$$

In Eq. 13, "sign( )" represents a function of extracting a sign, and "$Att_{PI}$" represents an attenuation amount to be changed in one step.

Meanwhile, if an absolute value of the difference between the current PI value $PI_{cur}$ and the control target value $PI_{target}$ is equal to or less than the threshold $TH_{PI}$ (NO in operation P32), the control circuit 92 may control the VOA loss in the same manner as the first embodiment (operations P11 to P13 of FIG. 11).

For example, when receiving the current gain values (monitor gain values) of the GAs 86 of four lanes from the gain value receiver 91 (operation P34), the control circuit 92 may calculate an average value of the monitor gain values of the respective lanes in the same manner as the first embodiment, for example, by Eq. 14 below.

$$Gain_{cur} = \frac{1}{4}\sum_{i=1}^{4} Gain_i \qquad [\text{Eq. 14}]$$

As in the first embodiment, the lanes targeted for averaging the gain values may not be a total of four lanes, and may be limited to some of the lanes. Further, for example, if the PDL of the received optical signal is negligible, subsequent processing may be performed by using the monitor gain value of one of the lanes.

Similarly to the first embodiment, for example, as expressed in Eq. 15 below, the control circuit 92 calculates a difference between a current gain value $Gain_{cur}$ obtained by averaging and a control target value $Gain_{target}$, and determines whether an absolute value of the difference is greater than a predetermined threshold $TH_{Gain}$ (operation P35).

$$|Gain_{cur} - Gain_{target}| > TH_{Gain} \qquad [\text{Eq. 15}]$$

As in the first embodiment, the threshold $TH_{Gain}$ and the control target value $Gain_{target}$ of the gain value may be stored, for example, in a memory (not illustrated) of the control circuit 92.

As a result of the threshold determination, if the difference is equal to or less than the threshold $TH_{Gain}$ (NO in operation P35), the control circuit 92 may return to operation P31 without controlling the VOA loss. On the other hand, if the difference is greater than the threshold $TH_{Gain}$ (YES in operation P35), the control circuit 92 may control the VOA loss, similarly to the first embodiment, such that the difference becomes smaller (operation P36).

A feedback control such as PID control may be applied to the control of the VOA loss. As a non-limiting example, similarly to the first embodiment, the control circuit 92 may perform proportional control using Eq. 4 or step control using Eq. 5 on the VOA loss.

As described above, the control circuit 92 adjusts the attenuation amount of the VOA 623 such that the gain value of the GA 86 approaches the control target value. Accordingly, it is possible to accurately adjust the input optical power level to the RxFE 622 to an appropriate range.

As described above, according to the third embodiment, in addition to the same effects as those obtained by the first embodiment, the gain value of the GA 86 in a power range in which the PI value is not appropriate is determined to be less reliable, and may be excluded from candidates for use in the estimation of the target channel power. Therefore, it is possible to further improve the control accuracy of the VOA loss.

Fourth Embodiment

Next, an operation example of the VOA controller 626 according to the fourth embodiment will be described with reference to a flowchart illustrated in FIG. 14. In the fourth embodiment, the VOA loss is controlled by supplementarily using both the optical power information obtained by the PD 624 and the PI obtained by the AGC 87. In other words, operations P21 to P25 of the second embodiment (FIG. 12) and operations P31 to P33 of the third embodiment (FIG. 13) may be combined with operations P11 to P13 of the first embodiment (FIG. 11).

Figure 14:
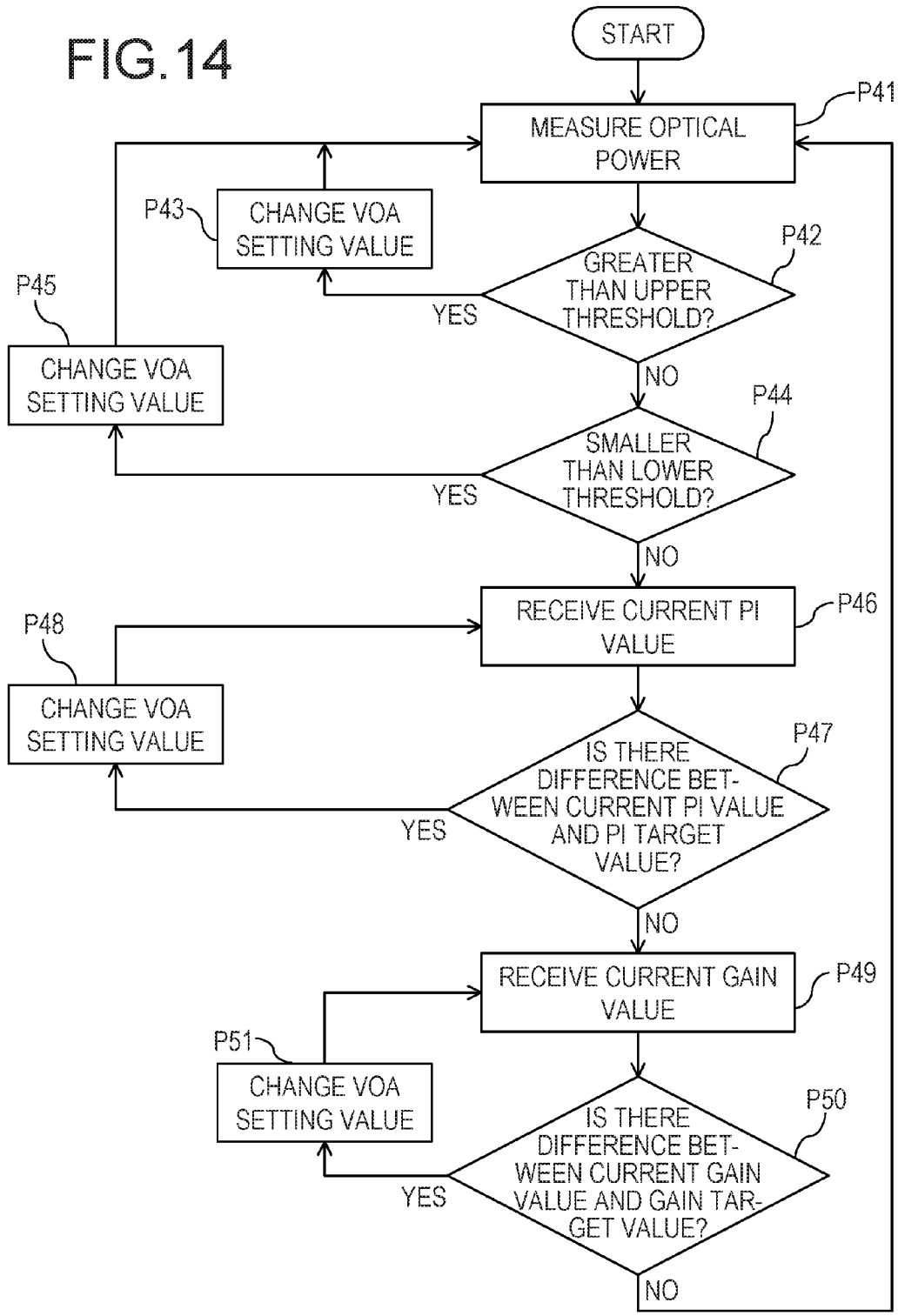
FIG. 14 is a flowchart illustrating an operation example of the VOA controller illustrated in FIG. 7 according to a fourth embodiment.

As illustrated in FIG. 14, the optical power information receiver 93 of the VOA controller 626 receives the current optical power information monitored by the PD 624 (operation P41). The received optical power information is provided to the control circuit 92.

The control circuit 92, as expressed in Eq. 6, compares the optical power information provided from the optical power information receiver 93 with a predetermined upper limit threshold, and determines whether current optical power information $PD_{cur}$ is greater than an upper threshold $TH_{PD\_upper}$ (operation P42).

As a result of the determination, if the optical power information is greater than the upper threshold (YES in operation P42), the control circuit 92 may increase and control the VOA loss such that light having power exceeding the upper limit of the reception range is not input to the RxFE 622 (operation P43). Accordingly, it is possible to prevent the RxFE 622 from malfunctioning or being damaged due to light of excessive power input to the RxFE 622.

Also in the fourth embodiment, in order to prevent the breakage or failure of the RxFE 622, the VOA loss may be set to a maximum value in advance as an initial value. In that case, the control circuit 92 may not change the VOA loss even if the optical power information is determined to be greater than the upper threshold. In other words, the VOA loss may be maintained at the maximum value.

In the meantime, if the current optical power information is equal to or less than the upper threshold (NO in operation P42), the control circuit 92 may further determine whether the current optical power information $PD_{cur}$ is smaller than a lower threshold $TH_{PD\_lower}$ as expressed in Eq. 7 (operation P44).

As a result of the determination, if the current optical power information is smaller than the lower threshold (YES in operation P44), the control circuit 92 may decrease and control the VOA loss, for example, such that the optical power sufficient to properly carry out the coherent detection is input to the RxFE 622 (operation P45).

Also in the fourth embodiment, because the input optical power to the PD 624 does not meet a minimum reception level of the PD 624, in some cases, the optical power information may not be received by the optical power information receiver 93.

Therefore, even if the input optical power is the smallest power that can be assumed, the initial value of the VOA loss may be set so as to obtain the optical power sufficient to enable the AGC by the AGC 87.

In this case, even though the optical power information obtained from the PD 624 is below the lower threshold, the control circuit 92 may return to operation P41 without changing the VOA loss (i.e., by bypassing operation P45).

The upper and lower thresholds of the optical power information, as in the second embodiment, may be stored, for example, in a memory (not illustrated) of the control circuit 92. The processing sequence of operations P42 and P44 of the threshold determination using the upper and lower thresholds may be reversed. Further, the threshold determination may be performed by using only one of the upper and lower thresholds.

As a result of the determination in operation P44, if the current optical power information is equal to or greater than the lower threshold (NO in operation P44), the control circuit 92 may perform the determination processing of the PI value in the same manner as the third embodiment.

For example, when receiving the current PI values of the AGCs 87 of four lanes from the PI receiver 94 (operation P46), the control circuit 92 may calculate an average value of the PI values of the respective lanes, for example, by Eq. 10 described above.

As described in the third embodiment, the lanes targeted for averaging the PI values may not be a total of four lanes, and may be limited to some of the lanes. Further, for example, if the PDL of the received optical signal is negligible, subsequent processing may be performed by using the PI value of one of the lanes.

For example, as expressed in Eq. 11 described above, the control circuit 92 calculates a difference between a current PI value $PI_{cur}$ obtained by averaging and a control target value $PI_{target}$ of the PI value, and determines whether an absolute value of the difference is greater than a predetermined threshold $TH_{PI}$ (operation P47). In other words, the control circuit 92 determines whether the current PI value falls within an appropriate setting range.

As in the third embodiment, the threshold $TH_{PI}$ and the control target value $PI_{target}$ of the PI value may be stored, for example, in a memory (not illustrated) of the control circuit 92.

As a result of the threshold determination, if the difference is greater than the threshold $TH_{PI}$ (YES in operation P47), the control circuit 92 may control the VOA loss such that the difference becomes smaller (operation P48) and return to operation P46.

In other words, if the current PI value is out of the appropriate setting range, as described above with reference to FIG. 9, the control circuit 92 may determine that the gain value of the GA 86 at the PI value is unreliable. Thus, the control circuit 92 may control the VOA loss until the PI value falls within the appropriate setting range.

For example, a feedback control such as PID control may be applied to the control of the VOA loss using the PI value. As a non-limiting example, the control circuit 92 may perform proportional control using Eq. 12 described above or step control using Eq. 13 described above on the VOA loss.

Meanwhile, if an absolute value of the difference between the current PI value $PI_{cur}$ and the control target value $PI_{target}$ is equal to or less than the threshold $TH_{PI}$ (NO in operation P47), the control circuit 92 may control the VOA loss in the same manner as the first embodiment (operations P11 to P13 of FIG. 11).

For example, when receiving the current gain values (monitor gain values) of the GAs 86 of four lanes from the gain value receiver 91 (operation P49), the control circuit 92 may calculate an average value of the monitor gain values of the respective lanes in the same manner as the first embodiment, for example, by Eq. 14 described above.

As in the first embodiment, the lanes targeted for averaging the gain values may not be a total of four lanes, and may be limited to some of the lanes. Further, for example, if the polarization dependent loss (PDL) of the received optical signal is negligible, subsequent processing may be performed by using the monitor gain value of one of the lanes.

Similarly to the first embodiment, for example, as expressed in Eq. 15 described above, the control circuit 92 calculates a difference between a current gain value $Gain_{cur}$ obtained by averaging and a control target value $Gain_{target}$, and determines whether an absolute value of the difference is greater than a predetermined threshold $TH_{Gain}$ (operation P50).

As in the first embodiment, the threshold $TH_{Gain}$ and the control target value $Gain_{target}$ of the gain value may be stored, for example, in a memory (not illustrated) of the control circuit 92.

As a result of the threshold determination, if the difference is equal to or less than the threshold $TH_{Gain}$ (NO in operation P50), the control circuit 92 may return to operation P41 without controlling the VOA loss. On the other hand, if the difference is greater than the threshold $TH_{Gain}$ (YES in operation P50), the control circuit 92 may control the VOA loss, similarly to the first embodiment, such that the difference becomes smaller (operation P51).

Similarly to the first embodiment, a feedback control such as PID control may be applied to the control of the VOA loss. As a non-limiting example, similarly to the first embodiment, the control circuit 92 may perform proportional control using Eq. 4 or step control using Eq. 5 on the VOA loss.

As described above, the control circuit 92 adjusts the attenuation amount of the VOA 623 such that the gain value of the GA 86 approaches the control target value. Accordingly, it is possible to accurately adjust the input optical power level to the RxFE 622 to an appropriate range.

As described above, according to the fourth embodiment, it is possible to obtain the same advantageous effects as the first to third embodiments in a combined manner.

Fifth Embodiment

In the first to fourth embodiments described above, the VOA loss has been controlled based on the result of monitoring the gain value of the GA 86. However, alternatively, even based on the output amplitude information of the TIA 85 (see, e.g., FIG. 7), the VOA control may be performed in the same way as the first to fourth embodiments. Since the output amplitude information of the TIA 85 is an electrical signal which is obtained by coherent detection and photoelectric conversion of the received optical signal and includes a signal component of the target channel in a limited manner, it is possible to estimate the target channel power from the electrical signal.

Figure 15:
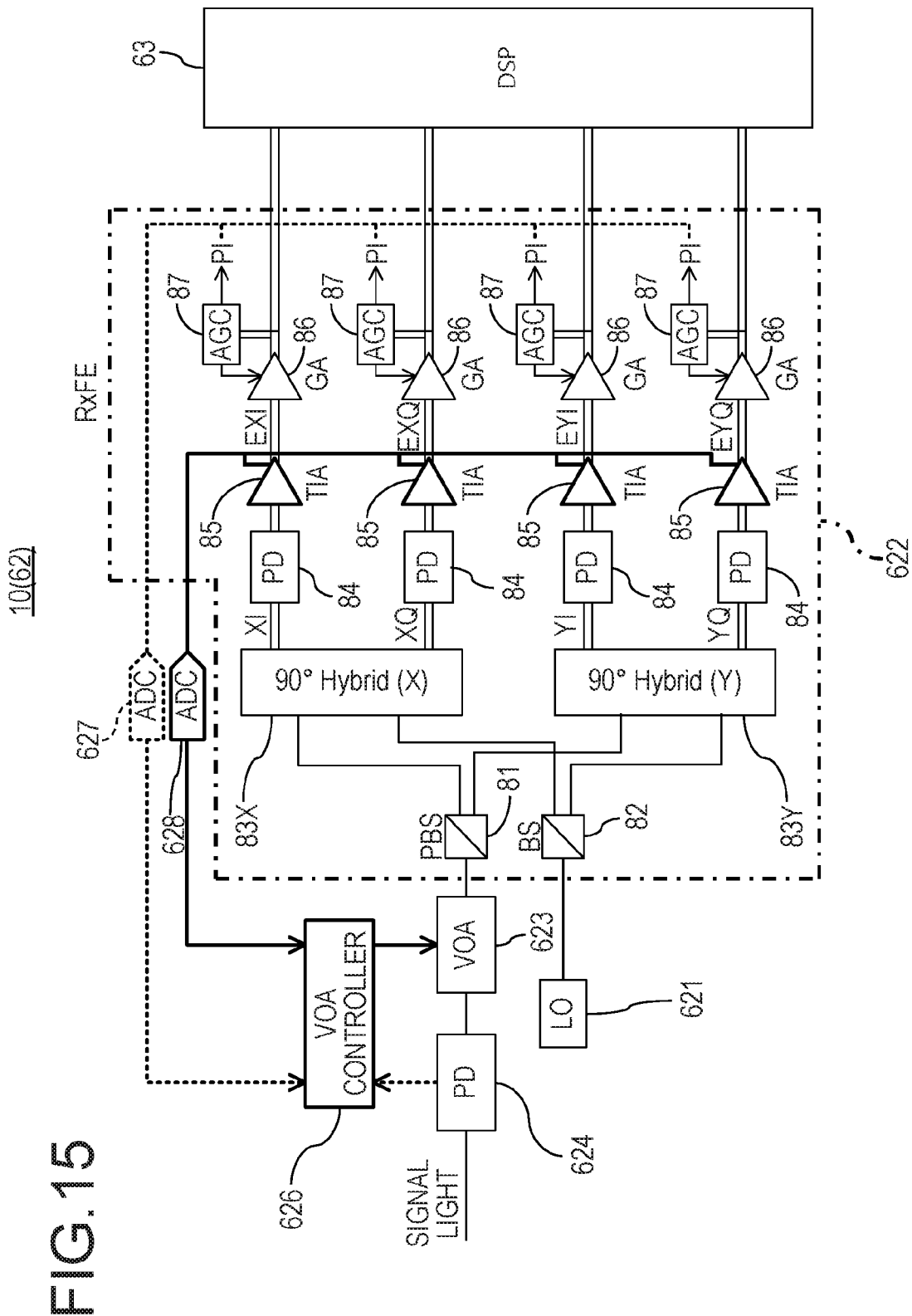
FIG. 15 is a block diagram illustrating an exemplary configuration of an optical receiver according to a fifth embodiment.
Figure 16:
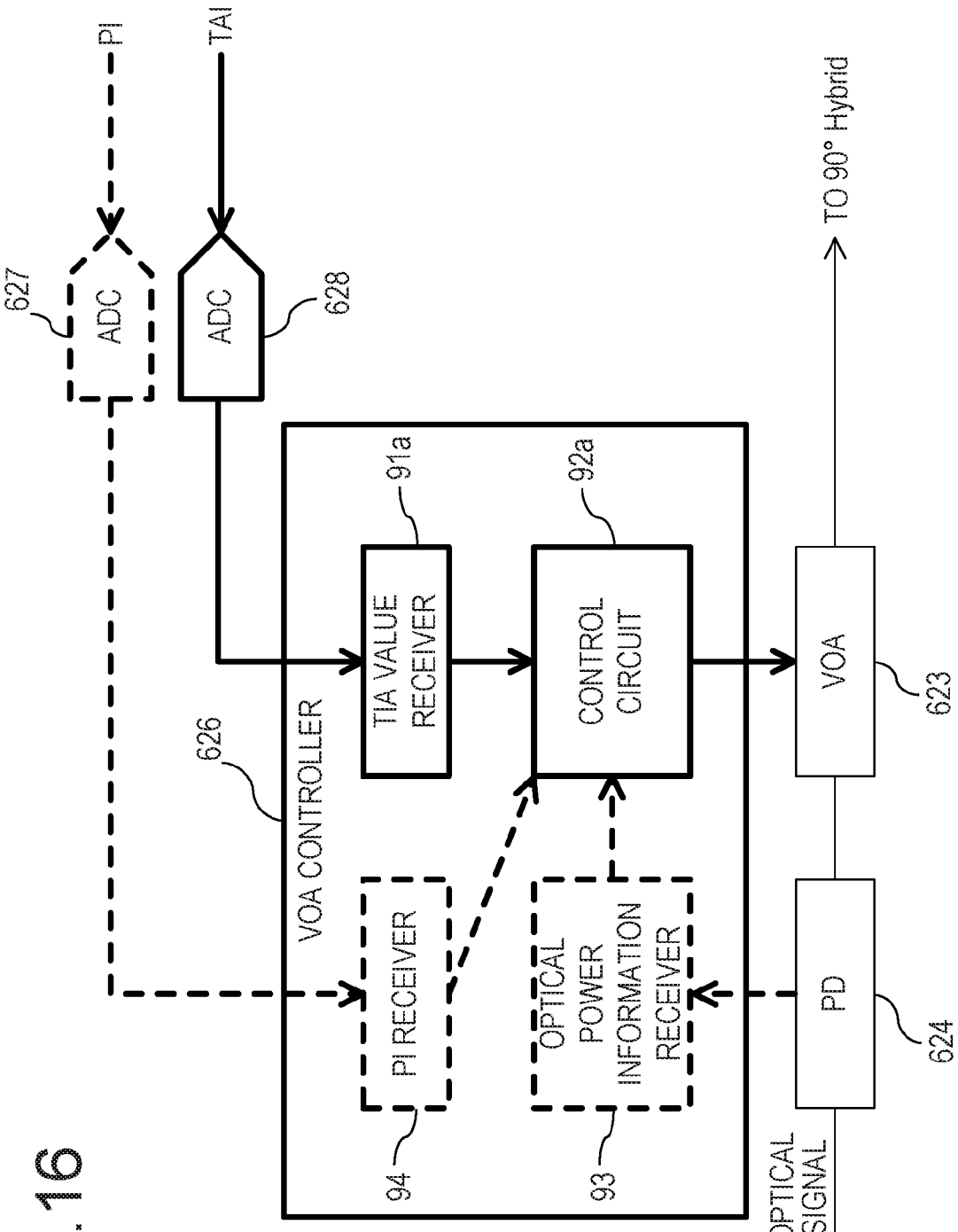
FIG. 16 is a block diagram illustrating an exemplary configuration of a VOA controller according to the fifth embodiment.

FIG. 15 is a block diagram illustrating an exemplary configuration of the Rx 62, equivalent to FIG. 7, according to the fifth embodiment. Further, FIG. 16 illustrates an exemplary configuration of the VOA controller 626 according to the fifth embodiment which is equivalent to FIG. 10.

The Rx 62 illustrated in FIG. 15 is different from the configuration illustrated in FIG. 7 in that the output of the TIA 85 is converted into a digital signal in an ADC 628 and input to the VOA controller 626. Further, the VOA controller 626 illustrated in FIG. 16 is different from the configuration illustrated in FIG. 10 in that a TIA value receiver 91a and a control circuit 92a are provided instead of the gain value receiver 91 and the control circuit 92.

The TIA value receiver 91a receives output amplitude information of the TIA 85 (may be referred to as a "TIA value" or "TIA monitor value"), which has been converted into a digital signal in the ADC 628.

The control circuit 92a may control the attenuation amount of the VOA 623 based on the TIA value. For example, the control circuit 92a may control the VOA loss such that a difference between the TIA value and a control target value of the TIA value becomes smaller.

Next, an operation example according to the fifth embodiment will be described with reference to a flowchart illustrated in FIG. 17.

Figure 17:
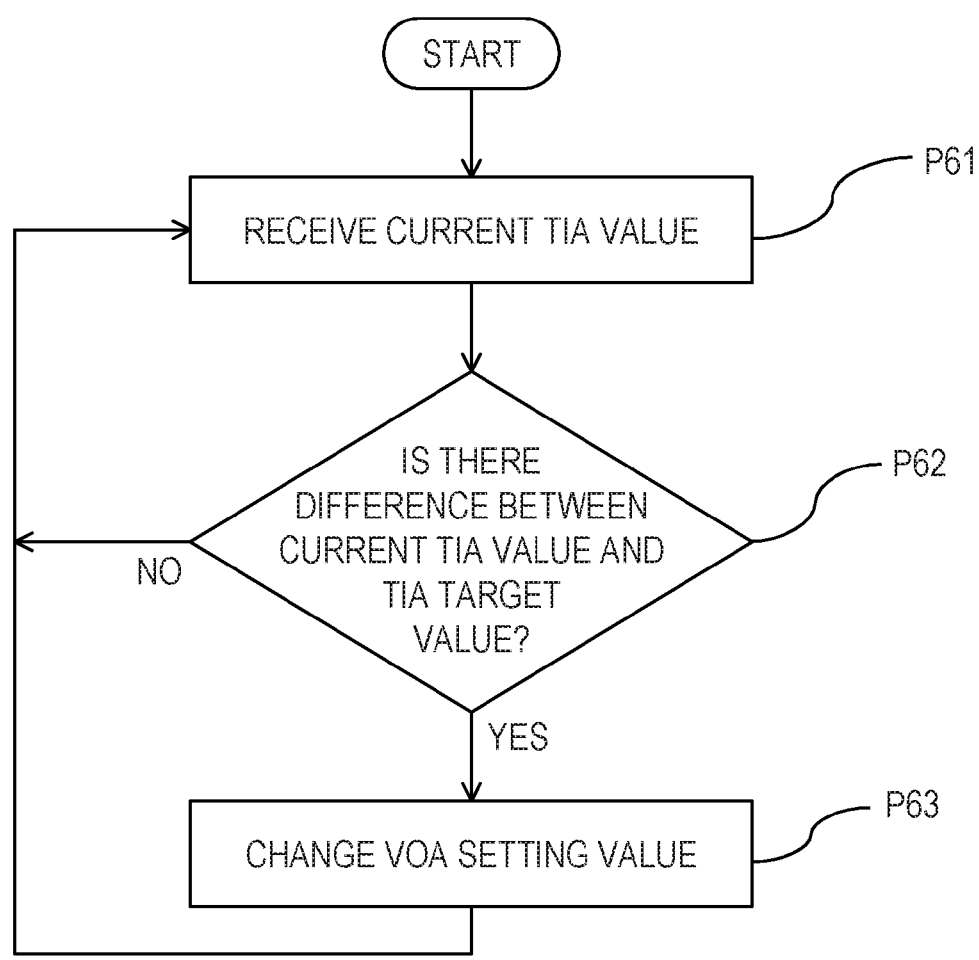
FIG. 17 is a flowchart illustrating an operation example of the fifth embodiment.

As illustrated in FIG. 17, the TIA value receiver 91a of the VOA controller 626 receives the current TIA values in the TIAs 85 of four lanes (operation P61). The TIA values received by the TIA value receiver 91a are provided to the control circuit 92a.

The control circuit 92a may calculate an average value of the TIA values of the respective lanes provided from the TIA value receiver 91a, for example, by Eq. 16 below.

$$Amp_{cur} = \frac{1}{4}\sum_{i=1}^{4} Amp_i \qquad \text{[Eq. 16]}$$

In Eq. 16, $Amp_i$ (i=1, 2, 3 or 4) represents the TIA value of one of four lanes (XI, XQ, YI, and YQ). Thus, the TIA values $Amp_i$ of four lanes, for convenience, may be denoted by $TIA_{XI}$, $TIA_{XQ}$, $TIA_{YI}$, and $TIA_{YQ}$.

By averaging the TIA values, it is possible to reduce the influence of variations that may occur in the X polarization component and the Y polarization component. The lanes targeted for averaging the TIA values may not be a total of four lanes, and may be limited to some of the lanes.

For example, among the TIA values of four lanes, the in-phase (I) components $TIA_{XI}$ and $TIA_{YI}$ or the quadrature (Q) components $TIA_{XQ}$ and $TIA_{YQ}$ of only two lanes may be selected and averaged.

Further, for example, if the PDL of the received optical signal is negligible, subsequent processing may be performed by using the TIA value of one of the lanes.

For example, as expressed in Eq. 17 below, the control circuit 92a calculates a difference between a current TIA value $Amp_{cur}$ obtained by averaging and a control target value $Amp_{target}$ of the TIA value, and determines whether an absolute value of the difference is greater than a predetermined threshold $TH_{TIA}$ (operation P62).

$$|Amp_{cur} - Amp_{target}| > TH_{TIA} \qquad \text{[Eq. 17]}$$

The threshold $TH_{TIA}$ and the control target value $Amp_{target}$ of the TIA value may be stored, for example, in a memory (not illustrated) of the control circuit 92a.

As a result of the threshold determination, if the difference is equal to or less than the threshold $TH_{TIA}$ (NO in operation P62), the control circuit 92a may return to operation P61 without controlling the VOA loss. In the meantime, if the difference is greater than the threshold $TH_{TIA}$ (YES in operation P62), the control circuit 92a may control the VOA loss such that the difference becomes smaller (operation P63).

For example, a feedback control such as PID control may be applied to the control of the VOA loss. As a non-limiting example, the control circuit 92a may perform proportional control or step control on the VOA loss.

Proportional Control

In the proportional control, the control circuit 92a may calculate an attenuation amount $Att_{new}$ to be newly set in the VOA 623, for example, by Eq. 18 below.

$$Att_{new} = Att_{prev} - \frac{1}{K_{TIA}} \cdot (Amp_{cur} - Amp_{target}) \quad [\text{Eq. 18}]$$

In Eq. 18, "$Att_{new}$" represents an attenuation amount to be newly set in the VOA 623, "$Att_{prev}$" represents an attenuation amount previously set in the VOA 623, and "$K_{TIA}$" represents a proportional constant.

Step Control

In the step control, the control circuit 92a may calculate an attenuation amount $Att_{new}$ to be newly set in the VOA 623, for example, by Eq. 19 below.

$$Att_{new} = Att_{prev} - \text{sign}(Amp_{cur} - Amp_{target}) \cdot Att_{TIA} \quad [\text{Eq. 19}]$$

In Eq. 19, "sign( )" represents a function of extracting a sign, and "$Att_{TIA}$" represents an attenuation amount to be changed in one step.

After setting the new VOA loss $Att_{new}$, the control circuit 92a may return to operation P61. As described above, the control circuit 92a adjusts the attenuation amount of the VOA 623 such that the TIA value approaches the control target value. Accordingly, it is possible to accurately adjust the input optical power level to the RxFE 622 to an appropriate range.

Moreover, comparing the gain value of the GA 86 with the TIA value, there are less uncertain factors in the TIA value than the gain value which is subjected to AGC by the AGC 87. Thus, in the case of using the TIA value, it can be expected to improve the control accuracy of the VOA loss as compared to the case of using the gain value of the GA 86.

Further, the VOA loss control using the TIA value may be applied to the second to fourth embodiments. For example, VOA loss control may be implemented by replacing "gain value" being monitored in the second to fourth embodiments with "TIA value" in the fifth embodiment.

As described above, according to the embodiments including the first to fifth embodiments, even in the multi-channel reception, in the Rx 62, it is possible to accurately detect (or estimate) the target channel power from the electrical signal obtained by coherent detection and photoelectric conversion. Therefore, it is possible to improve the control accuracy of the VOA loss.

For example, as compared to the case of using the power information obtained by the OCM 75 (see, e.g., FIG. 3), without being affected by the accuracy deterioration due to the optical power loss between the OCM 75 and the line card 60, it is possible to control the VOA loss with high precision.

Further, according to the embodiments including the first to fifth embodiments, since the VOA loss can be accurately controlled by the processing closed inside the line card 60, the OCM 75 may not be used. Thus, the control of the VOA loss does not depend on the factors, such as the failure of the OCM 75, outside the line card 60.

Moreover, since the OCM 75 may be unnecessary, it is possible to reduce the cost of installation of the OCM 75. Thus, it also contributes to a cost reduction of the optical transmission apparatus 10. Furthermore, since a delay time does not occur when transmitting the information obtained by the OCM 75 to the line card 60, there are no restrictions on the control speed of the VOA loss.

The embodiments including the first to fifth embodiments may be applied to a single channel reception, or may be applied to a reception of channels which are not polarization-multiplexed. For example, when compared with the VOA control using the monitor PD 624 illustrated in FIG. 2, in the above-described embodiments, since the monitor power information of the PD 624 may be auxiliary information, the monitor PD 624 may be unused (or uninstalled). Since the PD 624 may not be used, it is possible to reduce the power consumption and cost of the line card 60, eventually, the optical transmission apparatus 10.

In other words, in the embodiments including the first to fifth embodiments, since the VOA loss is controlled based on the electrical signal obtained by coherent detection and photoelectric conversion, the embodiments may be implemented regardless of the presence or absence and the position of the monitor PD 624 and whether the received optical signal is a polarization-multiplexed signal.

Further, in FIGS. 7, 10, 15 and 16, the monitor PD 624 is provided at a pre-stage of the VOA 623, but may be provided at a post-stage of the VOA 623 as illustrated in FIG. 6. Further, as illustrated in FIG. 5, the monitor PD 624 may be provided outside the Rx 62.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission apparatus comprising:
    an optical receiver configured to receive an optical signal;
    a variable optical attenuator configured to adjust a power of the optical signal to be input to the optical receiver according to a variable attenuation amount;
    a monitor configured to monitor a power of the optical signal to be input to the variable optical attenuator;
    a gain amplifier configured to amplify an electrical signal according to a variable gain subjected to an automatic gain control, the electric signal being obtained by performing a coherent detection and a photoelectric conversion on the optical signal received by the optical receiver; and
    a controller configured to control the attenuation amount of the variable optical attenuator based on the variable gain of the gain amplifier, a value of the power monitored by the monitor, and a peak indicator of the automatic gain control.

2. The optical transmission apparatus according to claim 1,
    wherein the controller, based on the gain and the monitored value,
    controls the attenuation amount so that the monitored value reaches between an upper limit and a lower limit of a reception range of the optical receiver, and
    controls the attenuation amount so that a difference between the gain and a control target value of the gain becomes smaller.

3. The optical transmission apparatus according to claim 1,
wherein the controller controls the attenuation amount based on the gain so that an output amplitude of the gain amplifier becomes constant.

4. The optical transmission apparatus according to claim 3,
wherein the controller
controls the attenuation amount so that a difference between the output amplitude and a target value of the output amplitude becomes smaller, and
controls the attenuation amount so that a difference between the gain and a target value of the gain becomes smaller.

5. The optical transmission apparatus according to claim 1,
wherein the optical receiver includes
a photodetector configured to photoelectrically convert the optical signal received by the optical receiver, and
a transimpedance amplifier configured to convert a current signal obtained by the photodetector into a voltage signal and to amplify the voltage signal, and
wherein the controller controls the attenuation amount based on an output amplitude of the transimpedance amplifier.

6. A method for controlling an optical power, the method comprising:
receiving, by an optical receiver, an optical signal;
adjusting, by a variable optical attenuator, a power of the optical signal to be input to the optical receiver according to a variable attenuation amount;
monitoring a power of the optical signal to be input to the variable optical attenuator;
amplifying an electrical signal according to a variable gain subjected to an automatic gain control, the electric signal being obtained by performing a coherent detection and a photoelectric conversion on the optical signal received by the optical receiver; and
controlling the attenuation amount based on the variable gain, a value of the monitored power, and a peak indicator of the automatic gain control.

* * * * *